(12) United States Patent
Colson et al.

(10) Patent No.: US 10,072,457 B2
(45) Date of Patent: Sep. 11, 2018

(54) UNITARY ASSEMBLY FOR AN ARCHITECTURAL FENESTRATION, PROVIDING DYNAMIC SOLAR HEAT GAIN CONTROL

(71) Applicant: Hunter Douglas, Inc., Pearl River, NY (US)

(72) Inventors: Wendell B. Colson, Weston, MA (US); David P. Hartman, Ashland, MA (US); Daniel M. Fogarty, Framingham, MA (US)

(73) Assignee: Hunter Douglas Inc., Pearl River, NY (US)

( * ) Notice: Subject to any disclaimer, the term of this patent is extended or adjusted under 35 U.S.C. 154(b) by 7 days.

(21) Appl. No.: 15/233,193

(22) Filed: Aug. 10, 2016

(65) Prior Publication Data

US 2016/0348425 A1    Dec. 1, 2016

Related U.S. Application Data

(63) Continuation of application No. 13/707,856, filed on Dec. 7, 2012, now Pat. No. 9,416,587, which is a
(Continued)

(51) Int. Cl.
*E06B 9/42* (2006.01)
*E06B 9/264* (2006.01)
(Continued)

(52) U.S. Cl.
CPC ............ *E06B 9/264* (2013.01); *E06B 3/263* (2013.01); *E06B 9/34* (2013.01); *E06B 9/386* (2013.01);
(Continued)

(58) Field of Classification Search
CPC . E06B 9/264; E06B 9/58; E06B 9/581; E06B 9/17046; E06B 9/17; E06B 9/40; E06B 2009/2429; E06B 2009/2423
(Continued)

(56) References Cited

U.S. PATENT DOCUMENTS 900,660 A  * 10/1908 Bruce .................... B60J 1/2055
160/274
1,217,261 A  * 2/1917 Zorba .................... B60J 1/2055
160/274
(Continued)

FOREIGN PATENT DOCUMENTS

WO    WO-2007092169 A1 *  8/2007  ............. E06B 9/581
WO    WO-2007122506 A2 * 11/2007  ............. E06B 9/165
(Continued)

OTHER PUBLICATIONS

USPTO Non-Final Office Action in related U.S. Appl. No. 13/129,808, dated Jan. 7, 2014.
(Continued)

*Primary Examiner* — Katherine W Mitchell
*Assistant Examiner* — Johnnie A Shablack
(74) *Attorney, Agent, or Firm* — Dority & Manning, P.A.

(57) ABSTRACT

A unitary assembly for an architectural fenestration, providing dynamic solar heat gain control, which (1) provides a track-based frame structure/blind combination in which the blind is self-correcting should the blind material fall outside of the track; (2) provides directional shading, where the assembly provides for dynamically controlling the amount of light allowed to reach the heat storage unit; (3) provides a blind motor without limiter switches and with a quick-release slip-ring; and (4) provides a heat storage unit which is a thermally efficient, transparent and translucent structure,
(Continued)

with which gain from sunny winter days is greater than nighttime loss, so as to provide supplemental heat.

27 Claims, 34 Drawing Sheets

Related U.S. Application Data continuation of application No. PCT/US2011/039473, filed on Jun. 7, 2011.

(60) Provisional application No. 61/352,632, filed on Jun. 8, 2010.

(51) Int. Cl.
    *E06B 9/34*     (2006.01)
    *E06B 3/263*     (2006.01)
    *E06B 9/386*     (2006.01)
    *E06B 9/388*     (2006.01)
    *E06B 9/44*     (2006.01)
    *E06B 9/58*     (2006.01)
    *E06B 9/72*     (2006.01)
    *E06B 9/68*     (2006.01)

(52) U.S. Cl.
    CPC ............... *E06B 9/388* (2013.01); *E06B 9/44* (2013.01); *E06B 9/581* (2013.01); *E06B 9/72* (2013.01); *E06B 3/26341* (2013.01); *E06B 2009/6809* (2013.01); *E06B 2009/6818* (2013.01); *Y02E 10/40* (2013.01)

(58) Field of Classification Search
    USPC ..... 160/270, 272, 273.1, 274, 277, 23.1, 26, 160/98–100, 120, 121.1
    See application file for complete search history.

(56) References Cited

U.S. PATENT DOCUMENTS

| | | | | |
|---|---|---|---|---|
| 1,962,868 | A | 6/1934 | Gregg | |
| 2,012,887 | A | 8/1935 | Major | |
| 2,024,090 | A * | 12/1935 | Cadmus | A47H 23/04 160/180 |
| 2,200,605 | A | 5/1940 | Pierce | |
| 2,231,778 | A | 2/1941 | Swanson | |
| 2,267,869 | A | 12/1941 | Loehr | |
| 2,847,730 | A * | 8/1958 | Warwick | E06B 7/082 52/473 |
| 3,467,037 | A | 9/1969 | Frydryk | |
| 3,990,201 | A | 11/1976 | Falbel | |
| 4,002,159 | A | 1/1977 | Angilletta | |
| 4,039,019 | A | 8/1977 | Hopper | |
| 4,066,062 | A | 1/1978 | Houston | |
| 4,078,323 | A | 3/1978 | Baumgarten | |
| 4,194,550 | A | 3/1980 | Hopper | |
| 4,197,896 | A * | 4/1980 | Reichstadt | E06B 9/17023 160/107 |
| 4,220,189 | A | 9/1980 | Marquez | |
| 4,247,599 | A | 1/1981 | Hopper | |
| 4,279,240 | A | 7/1981 | Artusy | |
| 4,301,787 | A | 11/1981 | Rice | |
| 4,338,996 | A | 7/1982 | Frank | |
| 4,357,978 | A * | 11/1982 | Keller | E06B 9/17046 160/271 |
| 4,359,079 | A | 11/1982 | Bledsoe | |
| 4,382,436 | A | 5/1983 | Hager | |
| 4,398,585 | A * | 8/1983 | Marlow | E06B 9/17076 160/23.1 |
| 4,399,855 | A * | 8/1983 | Volfson | E06B 9/11 160/23.1 |
| 4,458,739 | A | 7/1984 | Murray et al. | |
| 4,478,268 | A * | 10/1984 | Palmer | B65G 69/008 160/272 |
| 4,524,814 | A * | 6/1985 | Deziel | E06B 9/11 160/133 |
| 4,532,917 | A | 8/1985 | Taff et al. | |
| 4,535,828 | A | 8/1985 | Brockhaus | |
| 4,550,758 | A | 11/1985 | Johnson et al. | |
| 4,579,107 | A | 4/1986 | Deakin | |
| 4,638,844 | A | 1/1987 | Hayashiguchi | |
| 4,649,980 | A | 3/1987 | Kunz | |
| 4,658,806 | A | 4/1987 | Boozer | |
| 4,692,744 | A | 9/1987 | Hickman | |
| 4,722,382 | A | 2/1988 | Vecchiarelli | |
| 4,732,201 | A | 3/1988 | Dillitzer | |
| 4,763,890 | A | 8/1988 | Zimmerman et al. | |
| 4,987,943 | A * | 1/1991 | Charest | E06B 9/54 160/120 |
| 5,129,440 | A | 7/1992 | Colson | |
| 5,217,000 | A | 6/1993 | Pierce-Bjorklund | |
| 5,223,313 | A | 6/1993 | Holzer et al. | |
| 5,320,154 | A | 6/1994 | Colson et al. | |
| 5,325,579 | A | 7/1994 | Baier | |
| D352,856 | S | 11/1994 | Ford | |
| 5,467,266 | A | 11/1995 | Jacobs et al. | |
| 5,503,210 | A | 4/1996 | Colson et al. | |
| 5,547,006 | A | 8/1996 | Auger | |
| 5,566,738 | A | 10/1996 | Yadidya | |
| 5,586,592 | A * | 12/1996 | McGregor | E06B 9/15 160/133 |
| 5,600,974 | A | 2/1997 | Schnegg et al. | |
| 5,608,995 | A | 3/1997 | Borden | |
| 5,638,881 | A | 6/1997 | Ruggles et al. | |
| 5,657,805 | A * | 8/1997 | Magro | E06B 9/581 160/133 |
| 5,712,332 | A | 1/1998 | Kaieda et al. | |
| 5,839,492 | A * | 11/1998 | Young | E06B 9/264 160/107 |
| 5,862,851 | A * | 1/1999 | Stoebich | A62C 2/10 160/120 |
| 5,909,763 | A | 6/1999 | Link et al. | |
| 6,057,029 | A | 5/2000 | Demestre et al. | |
| 6,094,290 | A | 7/2000 | Crawford et al. | |
| D439,785 | S | 4/2001 | Throne | |
| D440,102 | S | 4/2001 | Colson et al. | |
| D444,658 | S | 7/2001 | Swiszcz et al. | |
| 6,257,302 | B1 | 7/2001 | Bednarczyk et al. | |
| D446,416 | S | 8/2001 | Throne | |
| 6,302,982 | B1 | 10/2001 | Corey et al. | |
| 6,374,896 | B1 | 4/2002 | Møller | |
| D459,933 | S | 7/2002 | Goodman | |
| 6,470,950 | B2 | 10/2002 | Shimizu | |
| 6,484,390 | B1 | 11/2002 | Gouldson et al. | |
| 6,550,519 | B2 * | 4/2003 | Green | E06B 9/26 160/236 |
| 6,589,613 | B1 | 7/2003 | Kunert | |
| 6,613,404 | B2 | 9/2003 | Johnson | |
| 6,688,369 | B2 | 2/2004 | Colson et al. | |
| 6,705,379 | B1 * | 3/2004 | Nien | E06B 9/303 160/172 R |
| 6,715,531 | B2 * | 4/2004 | Simon | E06B 9/581 160/271 |
| 6,722,416 | B2 * | 4/2004 | Varley | E06B 9/13 160/264 |
| 6,745,811 | B1 | 6/2004 | Nien | |
| 6,758,211 | B1 | 7/2004 | Schmidt | |
| D496,204 | S | 9/2004 | Tuzmen | |
| 6,792,994 | B2 | 9/2004 | Lin | |
| D498,105 | S | 11/2004 | Tyner | |
| 6,851,464 | B2 * | 2/2005 | Hudoba | E06B 9/13 160/31 |
| 6,860,079 | B2 | 3/2005 | Schwarz | |
| D503,578 | S | 4/2005 | Boehm | |
| 6,959,748 | B2 * | 11/2005 | Hudoba | E06B 9/42 160/121.1 |
| 7,017,644 | B1 * | 3/2006 | Kraeutler | E06B 9/174 160/271 |
| 7,058,292 | B2 | 6/2006 | Hirano | |
| 7,063,122 | B2 | 6/2006 | Colson et al. | |

(56) References Cited

U.S. PATENT DOCUMENTS

| | | | |
|---|---|---|---|
| 7,093,643 B2 * | 8/2006 | Ikle | E06B 9/11 160/120 |
| 7,100,666 B2 | 9/2006 | Colson et al. | |
| 7,302,988 B2 * | 12/2007 | Heitel | B60J 1/2011 160/266 |
| 7,389,807 B2 * | 6/2008 | Nagare | E06B 9/13 160/268.1 |
| 7,409,980 B1 | 8/2008 | Heissenberg | |
| 7,418,313 B2 | 8/2008 | Devis et al. | |
| 7,438,111 B2 * | 10/2008 | Grimes | E06B 9/08 160/23.1 |
| 7,500,505 B2 | 3/2009 | Smith et al. | |
| 7,513,292 B2 | 4/2009 | Auger et al. | |
| 7,516,770 B2 * | 4/2009 | Jerry | E06B 9/13 160/267.1 |
| 7,549,455 B2 | 6/2009 | Harper et al. | |
| 7,581,773 B2 * | 9/2009 | Strasser | B60R 7/04 160/183 |
| 7,588,068 B2 | 9/2009 | Colson et al. | |
| 7,665,506 B2 * | 2/2010 | Coenraets | E06B 9/13 160/266 |
| 7,708,047 B2 | 5/2010 | Auger | |
| 7,762,304 B2 * | 7/2010 | La Marca | E06B 9/88 160/1 |
| D622,964 S | 9/2010 | Colson | |
| D632,493 S | 2/2011 | Colson et al. | |
| 7,918,263 B2 * | 4/2011 | Kraeutler | E06B 9/17076 160/23.1 |
| D640,472 S | 6/2011 | Colson et al. | |
| D646,516 S | 10/2011 | Ehrsam | |
| 8,082,916 B2 | 12/2011 | Colson | |
| D657,176 S | 4/2012 | Stern | |
| 8,171,640 B2 | 5/2012 | Colson et al. | |
| D668,090 S | 10/2012 | Colson et al. | |
| 8,291,960 B2 * | 10/2012 | Bowman | E06B 9/13 160/267.1 |
| D671,349 S | 11/2012 | Judkins | |
| 8,360,132 B2 * | 1/2013 | Drifka | E06B 9/13 160/194 |
| 8,371,355 B2 * | 2/2013 | Santoro | E06B 9/42 160/268.1 |
| 8,371,357 B2 * | 2/2013 | Frede | E06B 9/581 160/133 |
| 8,474,508 B2 * | 7/2013 | Cha | E06B 9/262 139/384 A |
| 8,496,768 B2 | 7/2013 | Holt et al. | |
| D691,397 S | 10/2013 | Colson et al. | |
| D692,684 S | 11/2013 | Colson et al. | |
| 8,607,842 B2 * | 12/2013 | Drifka | E06B 9/13 160/266 |
| 8,639,387 B2 | 1/2014 | Byberg et al. | |
| 8,662,138 B2 * | 3/2014 | Komatsu | E06B 9/13 160/194 |
| 8,763,673 B2 | 7/2014 | Jelic et al. | |
| 8,820,384 B2 | 9/2014 | Boillot | |
| 8,951,372 B2 | 2/2015 | Van Nutt et al. | |
| 9,080,377 B2 | 7/2015 | Holt et al. | |
| 9,097,842 B2 | 8/2015 | Van Nutt et al. | |
| 9,109,812 B2 | 8/2015 | Colson | |
| 9,140,061 B2 * | 9/2015 | Cha | E06B 9/36 |
| 9,256,085 B2 | 2/2016 | McCarthy et al. | |
| 9,366,080 B2 * | 6/2016 | Colson | E06B 9/34 |
| 9,410,368 B2 * | 8/2016 | Drifka | E06B 9/13 |
| 9,416,587 B2 * | 8/2016 | Colson | E06B 9/264 |
| 9,428,955 B2 * | 8/2016 | Fleischman | E06B 9/58 |
| 9,458,663 B2 * | 10/2016 | Colson | B29C 66/723 |
| 9,476,252 B2 * | 10/2016 | Colson | E06B 9/262 |
| 9,540,874 B2 * | 1/2017 | Colson | E06B 9/34 |
| 9,574,394 B2 * | 2/2017 | Hsu | E06B 9/28 |
| 2003/0000171 A1 | 1/2003 | Schwarz | |
| 2003/0062136 A1 * | 4/2003 | Nien | E06B 9/262 160/84.04 |
| 2003/0098133 A1 | 5/2003 | Palmer | |
| 2003/0136527 A1 * | 7/2003 | Weiss | A47F 3/0469 160/271 |
| 2004/0144498 A1 * | 7/2004 | Hudoba | E06B 9/13 160/31 |
| 2005/0205217 A1 | 9/2005 | Harper et al. | |
| 2006/0000558 A1 | 1/2006 | Fennell | |
| 2006/0179991 A1 | 8/2006 | Nien et al. | |
| 2006/0191646 A1 | 8/2006 | Harper et al. | |
| 2006/0207730 A1 | 9/2006 | Berman et al. | |
| 2006/0247377 A1 | 11/2006 | Riegel et al. | |
| 2006/0289120 A1 * | 12/2006 | Pielmeier | E06B 9/17007 160/23.1 |
| 2007/0039699 A1 | 2/2007 | Colson et al. | |
| 2007/0074826 A1 | 4/2007 | Jelic et al. | |
| 2007/0088104 A1 | 4/2007 | Hung et al. | |
| 2008/0014446 A1 | 1/2008 | Donea et al. | |
| 2008/0041537 A1 * | 2/2008 | Mullet | E06B 9/00 160/271 |
| 2008/0066277 A1 | 3/2008 | Colson et al. | |
| 2008/0264572 A1 | 10/2008 | Forst Randle | |
| 2008/0303686 A1 | 12/2008 | Mosbrucker | |
| 2009/0090072 A1 | 4/2009 | To | |
| 2009/0205789 A1 | 8/2009 | Watkins et al. | |
| 2009/0321024 A1 | 12/2009 | Harper et al. | |
| 2010/0126675 A1 | 5/2010 | Jelic et al. | |
| 2010/0154783 A1 | 6/2010 | Colson | |
| 2010/0212842 A1 * | 8/2010 | Bichler | E06B 9/165 160/133 |
| 2010/0266801 A1 | 10/2010 | Jahoda et al. | |
| 2010/0276088 A1 | 11/2010 | Jelic et al. | |
| 2010/0276089 A1 | 11/2010 | Jelic et al. | |
| 2011/0088324 A1 | 4/2011 | Wessel | |
| 2011/0133940 A1 | 6/2011 | Margalit | |
| 2011/0170170 A1 | 7/2011 | Boote | |
| 2011/0220303 A1 * | 9/2011 | Colson | E06B 9/34 160/133 |
| 2012/0012262 A1 * | 1/2012 | Santoro | E06B 9/42 160/272 |
| 2012/0038841 A1 | 2/2012 | Taheri et al. | |
| 2012/0118514 A1 | 5/2012 | Hughes | |
| 2012/0222722 A1 | 9/2012 | Baruchi et al. | |
| 2012/0241104 A1 | 9/2012 | Huffer et al. | |
| 2012/0318475 A1 | 12/2012 | Glover | |
| 2013/0038093 A1 | 2/2013 | Snider | |
| 2013/0061846 A1 | 3/2013 | Colson et al. | |
| 2013/0098565 A1 * | 4/2013 | Colson | E06B 9/264 160/127 |
| 2013/0105094 A1 * | 5/2013 | Colson | B29C 66/723 160/133 |
| 2013/0128336 A1 | 5/2013 | Dean et al. | |
| 2013/0180676 A1 | 7/2013 | Berman et al. | |
| 2014/0034251 A1 | 2/2014 | Colson et al. | |
| 2014/0053989 A1 | 2/2014 | Colson et al. | |
| 2014/0366469 A1 | 12/2014 | Hodgson et al. | |
| 2015/0096695 A1 | 4/2015 | Baker et al. | |
| 2015/0096696 A1 * | 4/2015 | Sentjurc | E06B 9/17076 160/309 |
| 2015/0129140 A1 | 5/2015 | Dean et al. | |
| 2015/0184459 A1 | 7/2015 | Wang et al. | |
| 2015/0191959 A1 | 7/2015 | Schmohl et al. | |
| 2015/0292262 A1 * | 10/2015 | Miller | E06B 9/13 160/270 |
| 2016/0032646 A1 * | 2/2016 | Fleischman | E06B 9/40 160/309 |
| 2016/0090777 A1 * | 3/2016 | Brunton | E06B 9/582 160/133 |
| 2016/0145938 A1 * | 5/2016 | Colson | E06B 9/42 160/133 |
| 2016/0290040 A1 * | 10/2016 | Colson | E06B 9/34 |
| 2016/0348425 A1 * | 12/2016 | Colson | E06B 9/264 |
| 2016/0354972 A1 * | 12/2016 | Colson | B29C 66/723 |
| 2017/0122030 A1 * | 5/2017 | Zhang | E06B 9/582 |
| 2017/0211315 A1 * | 7/2017 | Fleischman | E06B 9/17 |

FOREIGN PATENT DOCUMENTS

| | | | | |
|---|---|---|---|---|
| WO | WO-2010059581 A2 * | 5/2010 | | E06B 9/34 |
| WO | WO-2012142522 A1 * | 10/2012 | | E06B 9/34 |

(56) References Cited

FOREIGN PATENT DOCUMENTS

OTHER PUBLICATIONS

USPTO Final Office Action in related U.S. Appl. No. 13/129,808, dated Aug. 14, 2014.

* cited by examiner

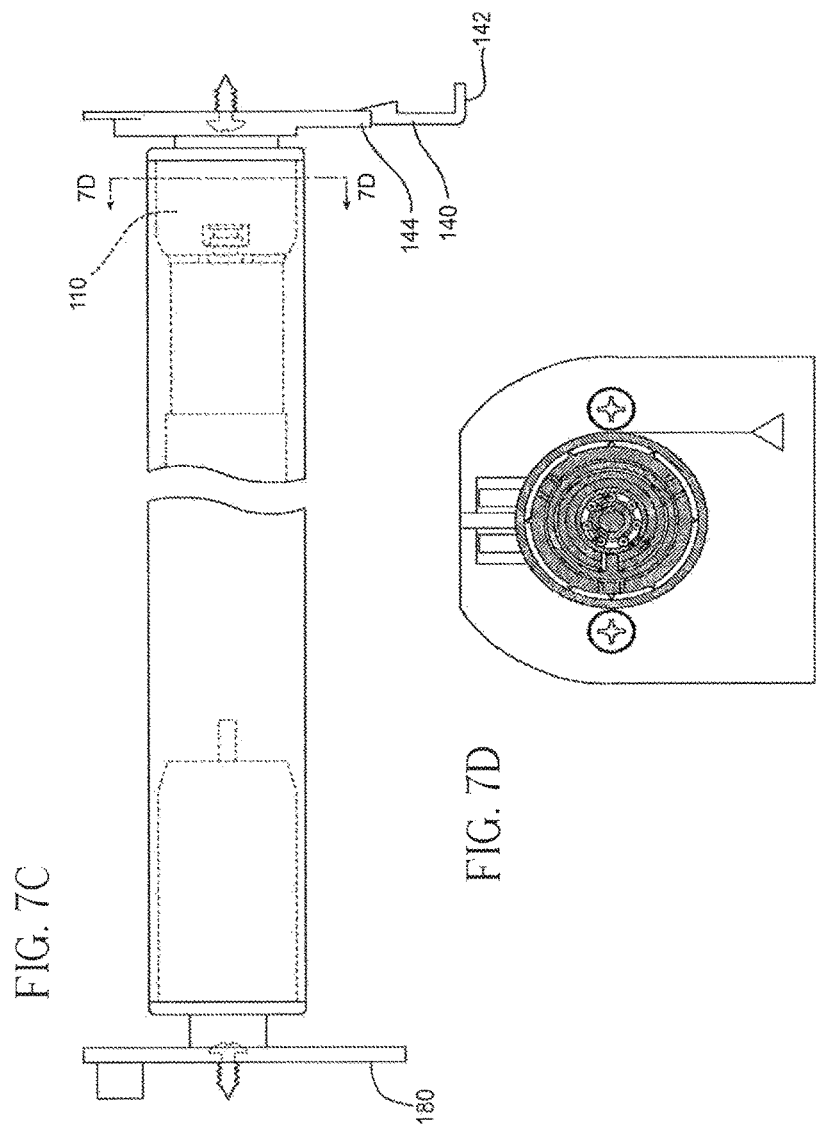

UNITARY ASSEMBLY FOR AN ARCHITECTURAL FENESTRATION, PROVIDING DYNAMIC SOLAR HEAT GAIN CONTROL

CROSS-REFERENCE TO RELATED APPLICATIONS

This patent application is a continuation of and claims the benefit of priority to U.S. patent application Ser. No. 13/707, 856 filed Dec. 7, 2012, which, in turn, is a continuation of and claims the benefit of priority to International Patent Application No. PCT/US11/39473 filed Jun. 7, 2011, both of which claim the benefit of priority to U.S. Provisional Patent Application No. 61/352,632, filed Jun. 8, 2010. Each of the foregoing patent applications is hereby incorporated by reference herein in its entirety for all purposes.

BACKGROUND OF THE DISCLOSED EMBODIMENTS

The objective of the present disclosure is to obtain a unitary assembly for an architectural fenestration, providing dynamic solar heat gain control, which: (1) provides a track-based frame structure/blind combination in which the blind is self-correcting should the blind fabric fall outside of the track; (2) provides directional shading, where the assembly provides for dynamically controlling the amount of light allowed to reach the heat storage unit; (3) provides a blind motor without limiter switches and with a quick-release slip-ring; and (4) provides a heat storage unit which is a thermally efficient, transparent and translucent structure, with which gain from sunny winter days is greater than nighttime loss, so as to provide supplemental heat.

According to a further object of the disclosure, options for the heat storage unit include a window-sized unitary collector and a collector comprising an array of smaller, individual collectors.

Regarding the first objective, blind fabric in a roller blind is not capable of remaining within a track without additional structural track guides. Should the fabric fall outside of the tracks, known track guides are unable to realign the blind fabric so as to enable the fabric to be automatically reinserted into the tracks. This patent document provides a solution to this problem.

Aspects of the remaining three objectives have been solved by the named inventor, as disclosed in International Patent Application No. PCT/US09/64682 for a "Slatted Roller Blind," filed Nov. 17, 2009 on behalf of Hunter Douglas Inc., of Upper Saddle River, N.J., USA, and which named as an inventor W. Colson; U.S. Provisional Patent Application No. 61/349,534 for a "Roller Blind Powered By Rotary Motor Without Limiter Switches, Optionally With A Quick-Release Slip-Ring," filed May 28, 2010, and which named as an inventor W. Colson; U.S. Provisional Patent Application No. 61/248,550 for a "Solar Energy Collector And Thermal Storage Device," filed Oct. 5, 2009 on behalf of W. Colson; and International Patent Application No. PCT/US2007/008616 for "Solar Heating Blocks," filed Apr. 5, 2007 on behalf of Hunter Douglas Inc., and which named as an inventor W. Colson, each of which is incorporated herein by reference in its entirety. This patent document provides a unitary solution which heretofore has been unknown.

SUMMARY OF THE DISCLOSED EMBODIMENTS

The patent document discloses a unitary assembly for an architectural fenestration, providing dynamic solar heat gain control, which: (1) provides a track-based frame structure/blind combination in which the blind is self-correcting should the blind fabric fall outside of the track; (2) provides directional shading, where the assembly provides for dynamically controlling the amount of light allowed to reach the heat storage unit; (3) provides a blind motor without limiter switches and with a quick-release slip-ring; and (4) provides a heat storage unit which is a thermally efficient, transparent and translucent structure, with which gain from sunny winter days is greater than nighttime loss, so as to provide supplemental heat.

BRIEF DESCRIPTION OF THE FIGURES

Certain embodiments of the invention will be described through the use of the accompanying drawings, which are not to be considered as limiting, and in which:

FIG. 7b illustrates the cross sectional plan view of the assembly of FIG. 6 along sectional lines B-B identified in FIG. 7a;

FIG. 7c illustrates a plan view of the of the assembly of FIG. 6, with sectional lines D-D;

FIG. 7d illustrates the cross sectional view of the axial proximate end of the assembly of FIG. 6 along sectional lines D-D identified in FIG. 7c, illustrating the torque limiter coupling and the distal side bracket in the background;

DETAILED DESCRIPTION OF THE DISCLOSED EMBODIMENTS

Various components of the unitary assembly for an architectural fenestration, which provides dynamic solar heat gain control, have been previously introduced in the incorporated patent documents. These components will now be briefly discussed.

The Slatted Roller Blind

Figure 1:
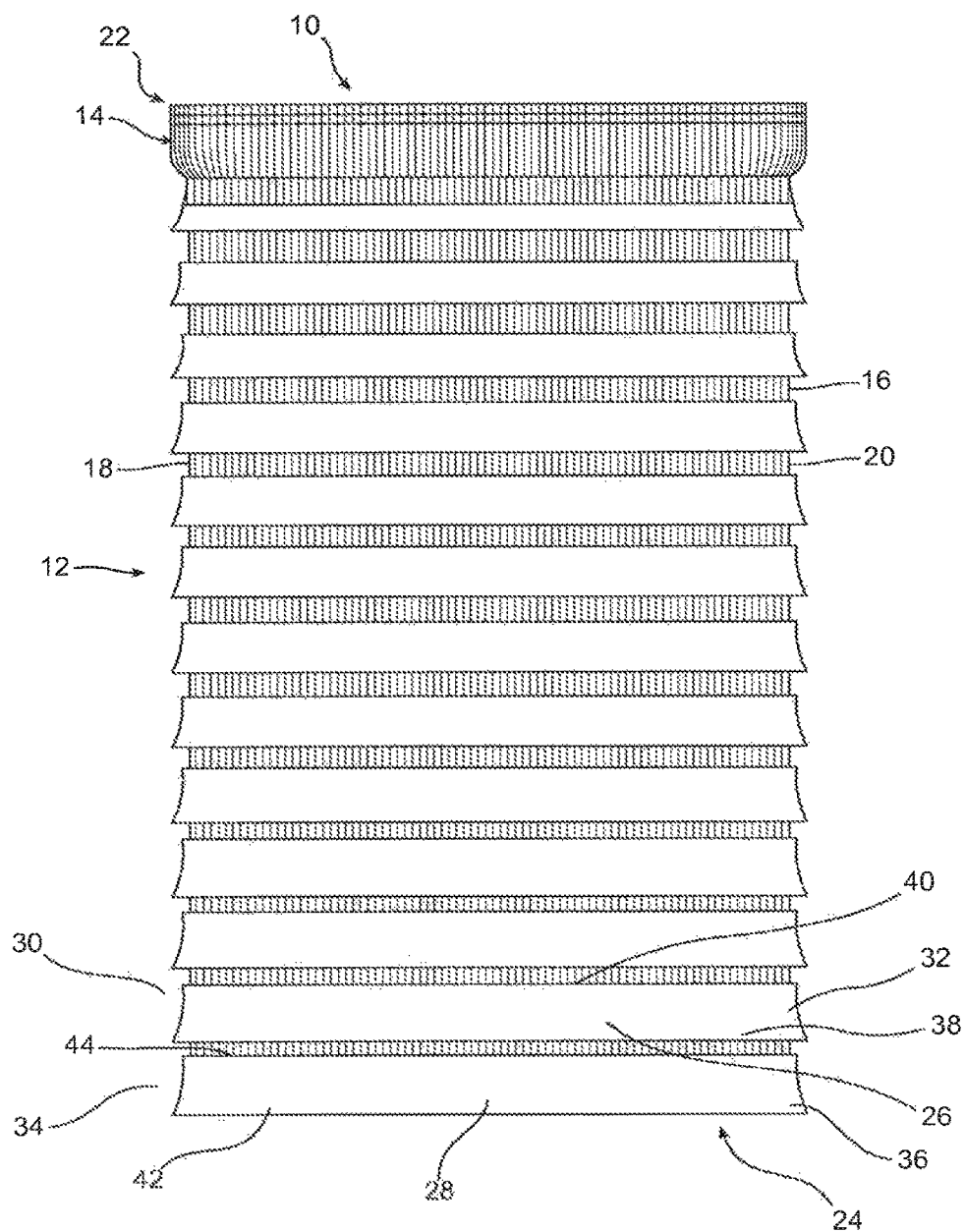
FIG. 1 illustrates the sun facing side of a disclosed slatted roller blind.

Turning to FIG. 1, the slatted roller blind 10 includes plural slats or louvers 12, which provide the blind with directional shading. A roller 14 is also included, and the axial length of the roller 14, spans the width of the blind 10. The roller 14 is designed to support the blind to without additional ladder cords. The illustrated roller 14 is about twenty inches long.

The slatted roller blind, includes a screen 16. The width of the screen, defined by opposing side edges 18, 20, is substantially the same as the width of the roller 14. The length of the screen 16, which is the length of the blind to, is defined by opposing top and bottom screen edges 22, 24. The top edge 22 is connected directly to the roller 14 and the bottom edge 24, when unwound, is vertically distanced therefrom. The screen length can be a typically available length for off-the-shelf roller blinds or can be a tailored length as specified for upscale window or door treatments.

The plural louvers 12 include, e.g., first and second vertically spaced slats 26, 28. Each of the slats has substantially the same length, defined, by opposing side edges 30, 32 in first slat 26, and opposing side edges 34, 36 in the second slat 28. Furthermore, the length of the slats is substantially the same as the length of the roller 14.

Each of the slats 26, 28 also has substantially the same circumferential dimension, defined by opposing front and back edges 38, 40 in the first slat 26, and opposing front and back edges 42, 44 in the second slat 28. The depth of each slat 36, 38 is proportional to Pi, which is effectively about a third of the circumference of the outer diameter of the roller 14.

Figure 2:
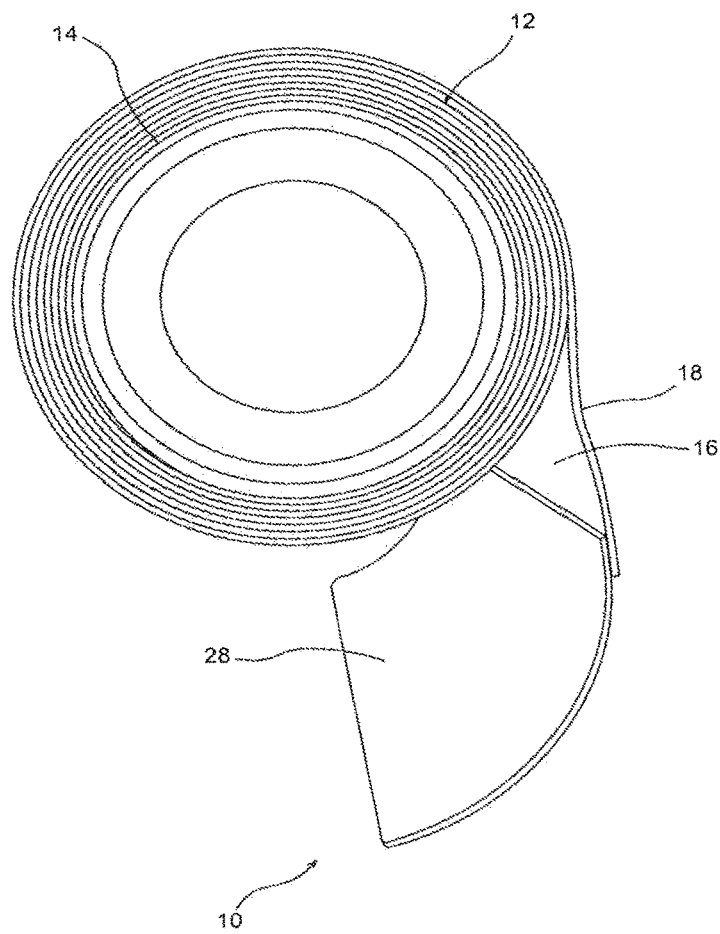
FIG. 2 illustrates a side view of the blind illustrated in FIG. 1.
Figure 3:
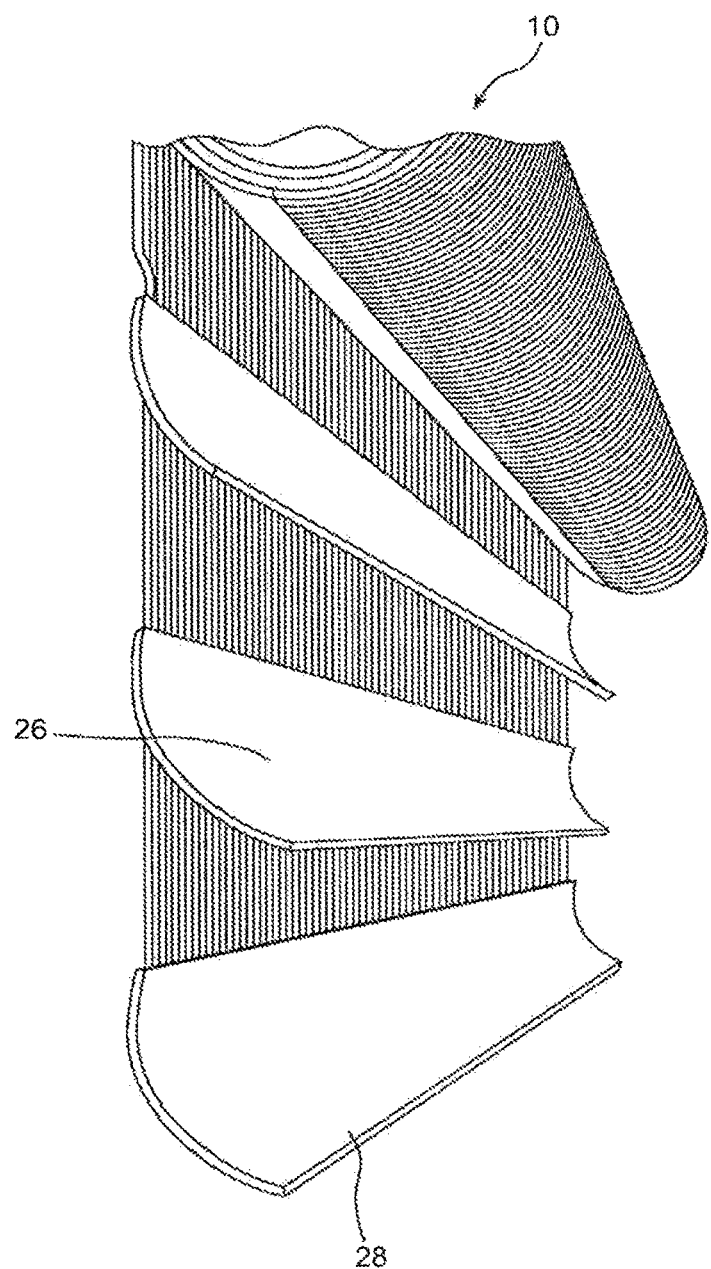
FIG. 3 illustrates a perspective view of the blind illustrated in FIG. 1.

FIGS. 2 and 3 illustrate the edge curvature of the louvers 12. As illustrated in FIG. 2, when retracted, the blind 10, with the screen 16 and louvers 12 wound about the roller 14, forms a spiral curve 46. The curvature of each slat edge is defined by the segment of the spiral curve 46 on which the respective slat is positioned when the blind is retracted. As such, the curvature in the set of louvers 12 changes progressively between each adjacent slat 26, 28. That is, slats nearer to the top of the blind to have a mean, or average radius which is less than that for slats nearer to the bottom of the blind.

The slatted roller blind, due to its compact retracted configuration, can be fabricated in relatively long units and rather easily subdivided with a hand or electric saw. For example, the blind can be fabricated in sixteen-foot width (i.e., along the axial length of the roller), which is about two and a half times the typical blind width. Statistically, such a width provides a reasonable yield when cutting for custom sized shades of the normal size range between three and eight feet wide.

Figure 4:
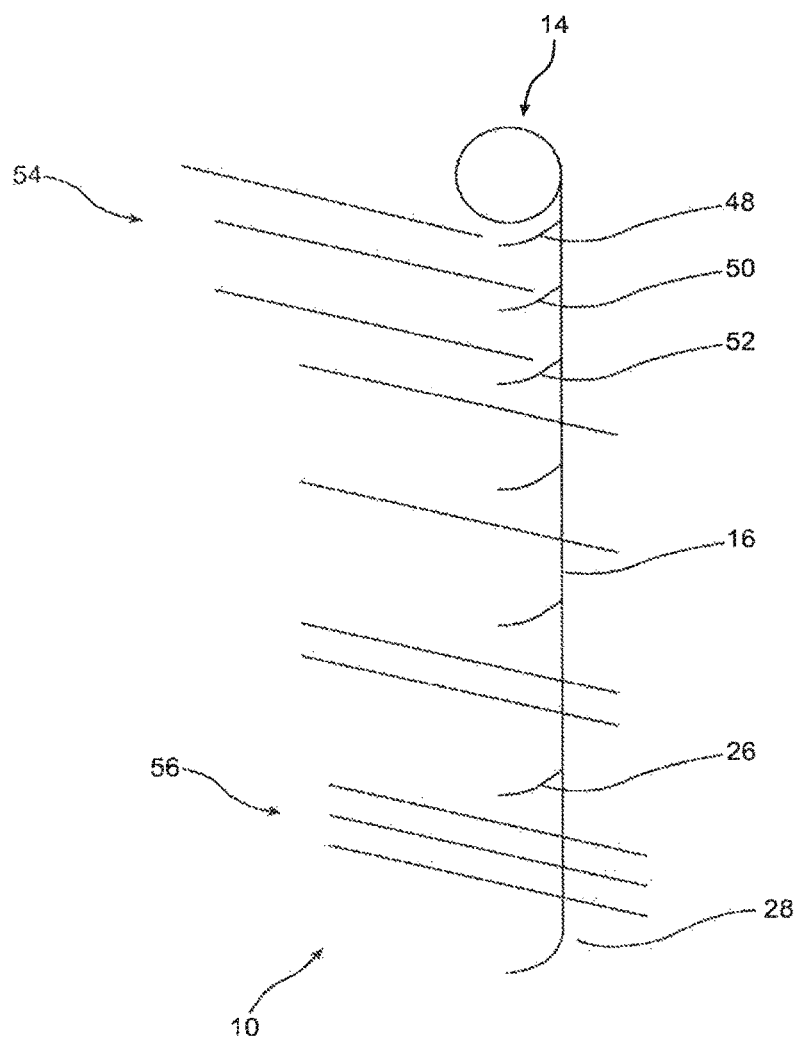
FIG. 4 illustrates a disclosed slatted roller blind in which the slats are height-wise progressively spaced.

In the embodiment illustrated in FIG. 4, a progressive spacing can also be provided between slats, as illustrated in exaggerated form in the figure. Here, the blind to is installed such that the front edge of the slats projects towards the direct incident light.

As illustrated, vertical spacing between adjacent slats, i.e., lengthwise along the screen, progressively increases, starting at the top slat and continuing to the bottom slat. For example, turning to the top three slats 48, 50, 52, the distance between the second and third slats 50, 52 is greater than the distance between the first and second slats 48, 50. The actual spacing gradient between each slat could increase by, for example, ten-thousandths to fifteen-thousandths of an inch.

In the figure, direct incident light is illustrated in as sets of essentially parallel lines 54, 56. Due to the progressive spacing, direct light is blocked from passing through the top pair of slats 48, 50. However, some direct light is capable of passing through, for example, the bottom pair of slats (the aforementioned first and second slats) 26, 28.

The progressive spacing provides more view and less shade through the bottom slats 26, 28 as compared with the top slats 48, 50. As a result, sunlight is allowed to enter and brighten a space while being blocked from the eyes of persons standing in the space. Other spacing options include the reversed spacing progression, a constant spacing between slats, a progression defined by non-linear gradient, such as a parabolic gradient, or a non-uniform gradient.

Materials used for the slatted roller blind 10 include, for the roller 14 illustrated in FIG. 1, an aluminum tube having an outer diameter of approximately one inch and a wall thickness of approximately a sixteenth of an inch. Other tube materials and sizes could be utilized, including, e.g., a two inch outer diameter tube.

For external purposes, a rollable screen or film suitable for outdoor exposure is utilized. A film material may include Clear polyester while screen materials may include metal, such as aluminum, or plastic, vinyl, fiberglass, and the like. A typical window screen, for example, can be fabricated from an aluminum mesh or core-and-sheath, such as vinyl-coated fiberglass yarns, or polyethylene coated polypropylene yarns, which are heat-fused after weaving to fix the yarns at their crossing-points. A screen in the form of a wire mesh material may be oriented at a forty-five degree angle or some other angle which offsets the mesh from a typical window or door screen orientation, so as to avoid a visual moiré pattern. Regarding the film option, one benefit of a film as compared with the screen is a relatively unobstructed view between the slats.

The slats 26, 28 are manufactured from a thermoplastic, such as PVC, PET (polyester) or polycarbonate, e.g., seven to fifteen mils thick PVC, PET, or PC film, which is thermo-formable at between one hundred and seventy and two hundred and fifty degrees F. This temperature range is just one example, and a different (e.g., larger) range, depending on material conditions, would fall within the scope of the invention. The slats 26, 28 can be adhered to the screen 16 at the respective slat rear edges 40, 44 using a co-polyester adhesive hot-melt, applied under pressure.

Rotary Motor without Limiter Switches and with a Quick-Release Slip-Ring

Figure 5:
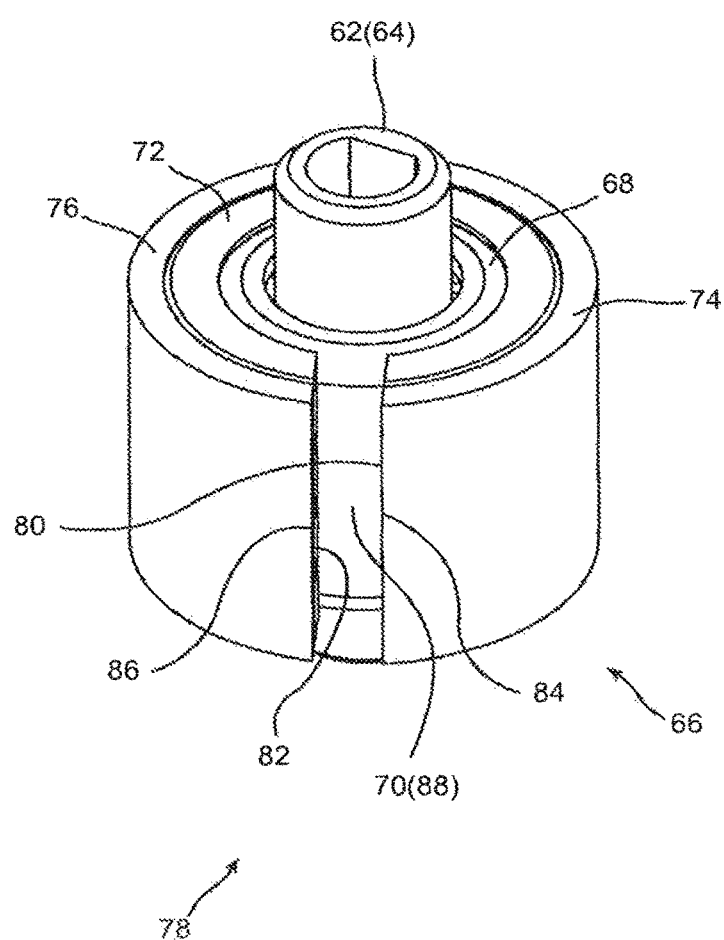
FIG. 5 illustrates a torque limiting motor coupling.

FIG. 5 illustrates a torque limiter coupling 60 in the disclosed motor which is unable to apply torque in the unwind direction and is able to slip in the winding direction upon reaching a threshold torque level.

The motor coupling 60 includes an adaptor shaft 62, which is a keyed cylinder, adapted to fit outside of a motor drive shaft. Surrounding the adaptor shaft 62, centered between opposing ends 64, 66 of the adaptor shaft 62, is a one-way bearing 68. On the outer race of the bearing 70, a slip-clutch 72 is provided which is designed to slip against the hearing.

Holding the slip-clutch in place, on its radial outer surface 74, is a spring 76, the selection of which, in combination with clutch material and clutch material thickness, defines the threshold torque required to slip the clutch against the bearing. The slip-clutch 72 configuration is selected so that slip occurs at a greater torque than required to wind the roller blind fabric. On the other hand, the configuration is selected so that slip occurs at a lower torque than required to strain the motor.

The hearing 68, clutch 72 and spring 76 are axially centered against each other and have substantially the same axial dimension. The shaft 62 is longer than the bearing, clutch and spring, which provides the benefits outlined in the incorporated patent document.

Providing the axial buffer zone on both sides of the coupling 60 enables reversing the coupling 60 depending on whether the motor is placed on the left or right hand side within the roller tube, due to, e.g., the location of available wiring. Reversing the coupling is achieved by sliding the adaptor shaft 62 off of the motor shaft and reinstalling the adaptor shaft 62 so that the distal end 66 of the adaptor shaft 62, rather than the proximate end 64, faces the distal end of the motor.

A cavity 78 is defined between opposing, circumferentially spaced edges 80, 82 of the slip-clutch 72 and edges 84, 86 of the spring 76, rendering the slip-clutch 72 and spring 76 "C" shaped. Specifically, a base 88 of the cavity is the outer race of the bearing 70, a first side of the cavity 90 is defined by aligned edges 80, 84 of the clutch 72 and spring 76, and a second side of the cavity 92 is defined by aligned edges 82, 86 of the clutch 72 and spring 76.

The cavity 78 positioned against a tang 94, illustrated in FIGS. 6-9, and discussed below. The tang has a radial inner surface 96 which does not reach the bearing, as well as opposing circumferential surfaces 98, 100. The tang 94 moves circumferentially between opposing sides of the cavity so that one of the tang surfaces 98, 100 presses against a respective one of the cavity surfaces 90, 92, whereby the tang rotates with the slip-clutch 72.

Turning to FIGS. 6-9 the coupling 60 is applied to an assembly including a rotary motor 102 powered by a timed-pulse of current. In these figures, and FIG. 10, with respect to the motor in a plan view, "axial proximate" or "proximate" means closer to the right side of the figure. On the other hand, "axial distal" or "distal" means further from the right side of the figure. In these figures, the timer electronics are not identified. However, obtaining timer electronics and remotely integrating the timer functionality is within the skill-set of the ordinary artisan who has read this disclosure.

The motor coupling 60 is fitted on the proximate end 104 of the motor 102, i.e., on the motor drive shaft 106, so that the distal end of the adaptor shaft 66 is positioned against a distal end 108 of the drive shaft 106. An end cap no, through which the motor drive shaft 136 connects with the motor coupling 60, securely connects the motor 102 to the roller tube 14. This connection enables the motor 102 to turn with the roller tube 14, subject to slippage provided by the motor coupling 60, as discussed below.

The end cap 110 forms an axially extending cup-type cavity having a distal base portion 114, and which opens on its proximate end 116. The cap base portion 114 includes a radially central opening 118 which is large enough for the adaptor shaft 62 of the motor coupling 60 (FIG. 5) to pass through. The cap base portion 114 is axially between the proximate end 104 of the motor 102 and the distal end 120 of the bearing, clutch and spring components of the motor coupling 60. This configuration enables removal of the motor coupling 60 without disassembling the end cap and motor from each other. The rolling direction of the roller bearing 68 with respect to the motor shaft can be reversed without extensive handling of the system to enable operation of the motor in either a left-handed or right-handed assembly.

A minimum amount of axial play 122 is provided between the cap base portion 114 and the distal end 120 of the bearing, clutch and spring components of the motor coupling 60. This configuration prevents binding of these components during use. The cap base portion 114 is axially thick enough to seat and physically isolate motor mounts 124 from the coupling 60. The motor mounts 124 include a plurality of circumferentially spaced rubber bushings 126, serving as vibration isolators, in which standoff mounts 128 and screws 130 are inserted for connecting the end cap no to motor 102. Aside from the elastic material of the bushings 126, the bushings also axially space the end cap 110 from the motor 102, to further isolate motor vibrations. The opened proximate end 116 of the end cap no includes a radially outward extending lip 132. The lip 132 seats against a proximate end 188 of the roller tube 14.

Fixed to the proximate side of the architectural opening is the stationary wall bracket 134 connected via screws 136. The wall bracket 134 can slidably receive a stationary tube bracket 138. The tube bracket 138 is removable and insertable into the wall bracket 134 via a flexible extension 140 with a grip portion 142. A clip 144 securely connects the tube bracket 138 with the wall bracket 134, and which can be released by flexing the grip portion 142. Removing tube bracket 138 from the wall bracket 134 removes the blind assembly from the architectural opening. On the other hand, inserting the tube bracket 138 into the wall bracket 134 installs the blind assembly into the architectural opening.

Fixedly connected to the distal side 146 of the stationary tube bracket 138 is the proximate end 148 of a drive ring 150. These components are connected via, e.g., circumferentially spaced screws 152. The drive ring 150 is an axially extending cup-type cavity having a proximate base 154 and which opens on its distal end 156. The distal end 156 has a diameter enabling it to fit into the opening in the proximate end 116 of the end cap 110. A radially inward step 158 at the drive ring base 154 is adapted for being releasably gripped by circumferentially spaced flexible gripping members 160 formed at the end cap lip 132.

The drive ring base 154 is axially thick enough to seat and encase the screws 152 in countersunk openings 162. The drive ring 150 is configured such that when it is inserted into and encased by the end cap no, a distal surface 164 of the drive ring base 154 sits essentially against the proximate end 166 of the bearing, clutch and spring components of the motor coupling 60.

The drive ring base 154 includes an adaptor shaft support cavity 168, which is an axially extending cup-type cavity formed in its radial center and which opens into the drive ring 150. The support cavity 168 is large enough to seat the proximate portion 64 of the adaptor shaft 62 which extends axially past the proximate end 166 of the bearing, clutch and spring components of the motor coupling 60.

The length of the distal portion 66 of the adaptor shaft 62 is the same as that of the proximate portion 64 of the adaptor shaft 62. This enables fitting the distal portion 66 in the support cavity 168 for reversing the motor coupling 60 about the motor shaft 106, depending on whether the blind is a left-handed or right-handed assembly. Between the distal end of the drive ring base 164 and the distal end of the drive ring 156, the above mentioned tang 94 is provided. When inserted into the end cap no, the distal end of the tang 170, which defines the distal end of the drive ring 156, is essentially axially flush with the distal end of the bearing/clutch and spring 120. This provides a maximum connection between the tang 94 and the cavity 78 in the coupling 60.

As the drive ring and tang are stationary, movement in the motor translates into rotating the motor, not the tang. The connection between the motor and the roller tube via the end cap turns the roller tube with the motor so long as the motor is not rolling against the tang via action of the bearing or slipping against the tang via action of the clutch.

The tube bracket 138 is formed with an axially extending cup-type cavity 172, which opens on the distal end 146 of the tube bracket 138 for receiving the drive ring support cavity 168. The tube bracket cavity 172 is sized to seat and encase the screws 152 connecting the tube bracket 138 to the drive ring 150.

The above motor configuration provides a rotary drive motor for the roller blind. This configuration differs from the customary drive system for blinds in which the motor is stationary. It also differs from the customary systems in that the limiter system is replaced by electronics, providing a timed-pulse of power, which is combined with the torque limiting motor coupling 60. With these components, the rotary motor is self regulating if subjected to obstructions during a winding/unwinding operation and/or if the blind is reinstalled any number of times for any reason.

Figure 6:
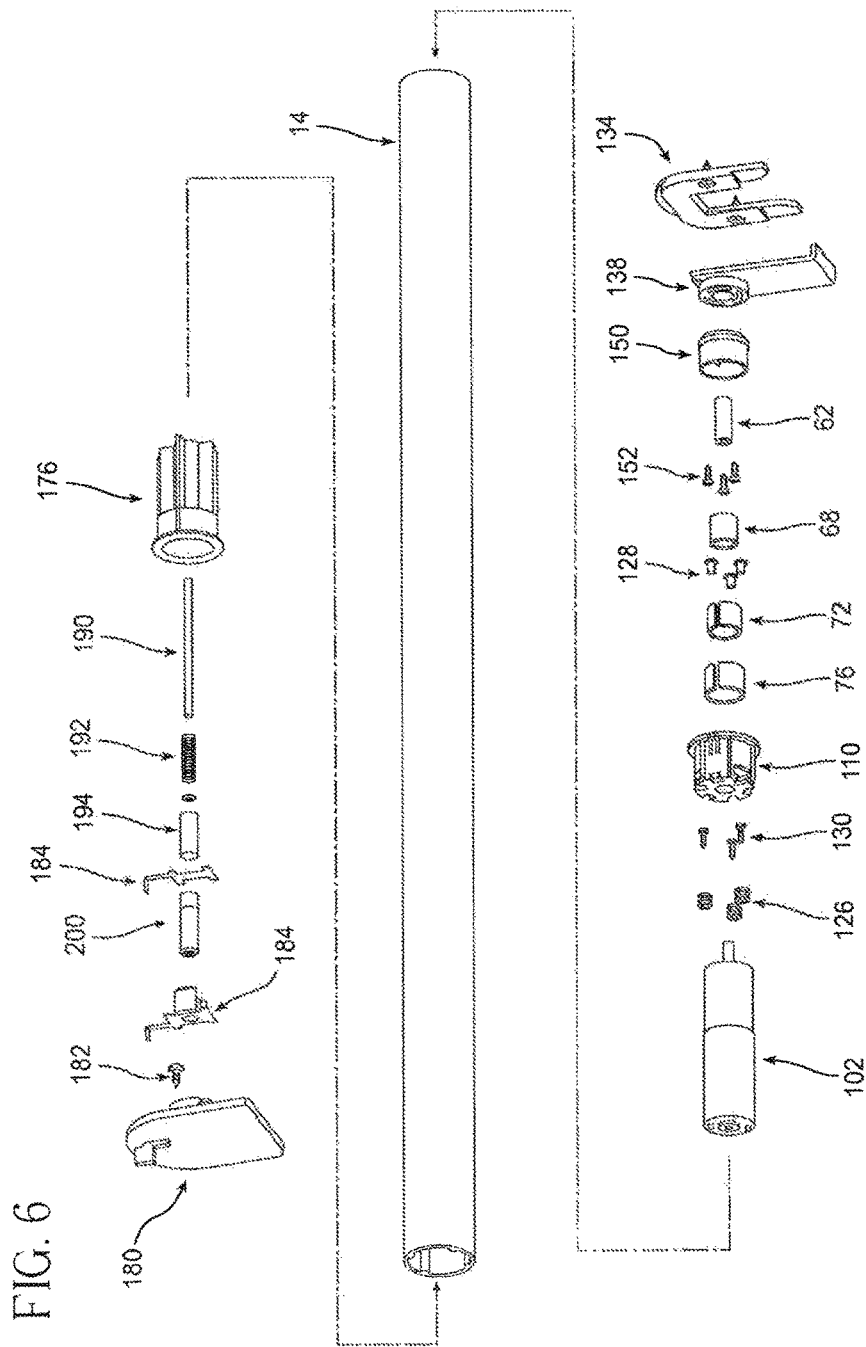
FIG. 6 illustrates an exploded view of a blind assembly configuration which includes the motor coupling of FIG. 5 as well as a quick-release slip-ring.
Figure 7A:
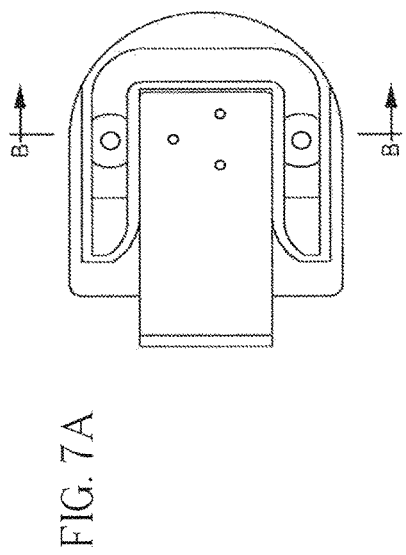
FIG. 7a illustrates an elevational view of the proximate portion of the assembly of FIG. 6, with sectional lines B-B.
Figure 7B:
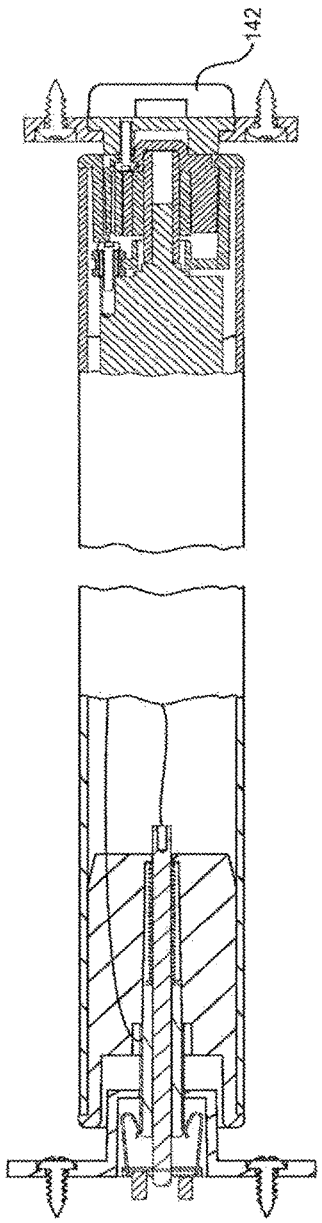
Figure 8:
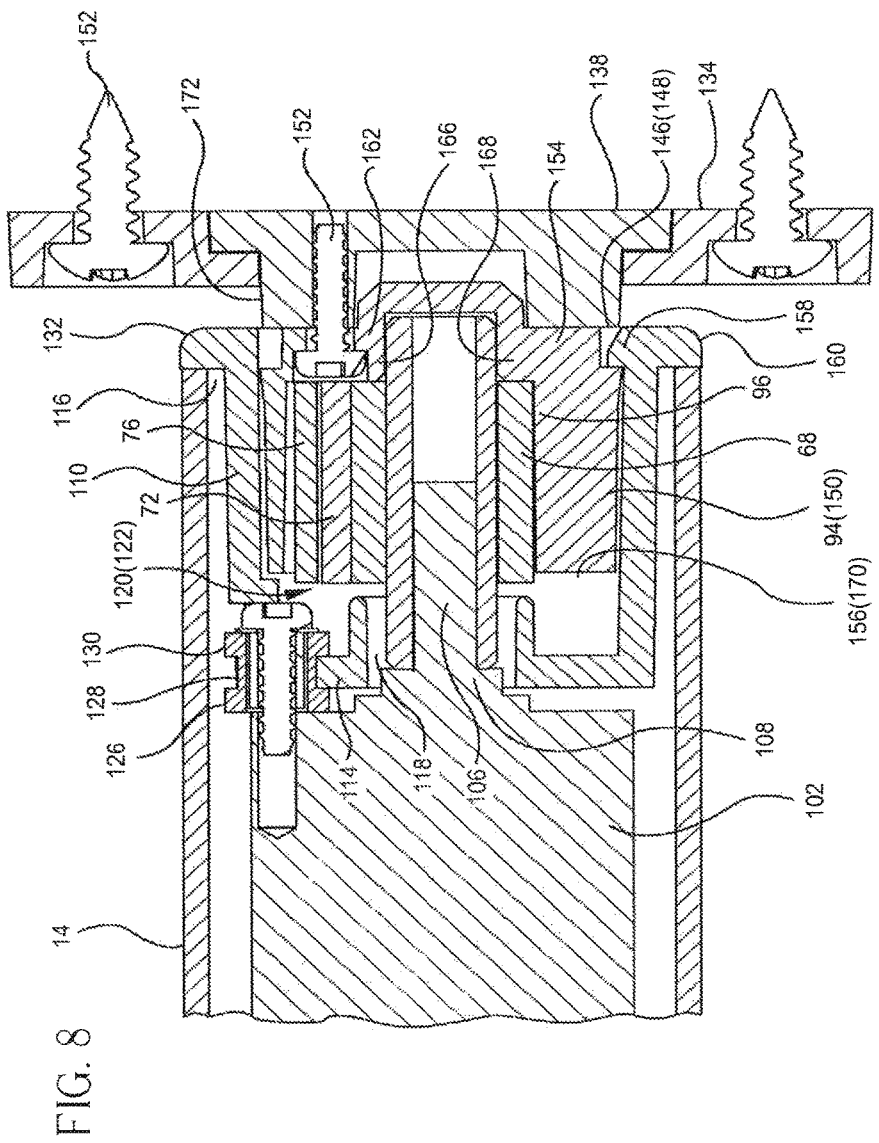
FIG. 8 illustrates a magnified cross sectional view of the proximate end of the assembly as illustrated in FIG. 7b.
Figure 9:
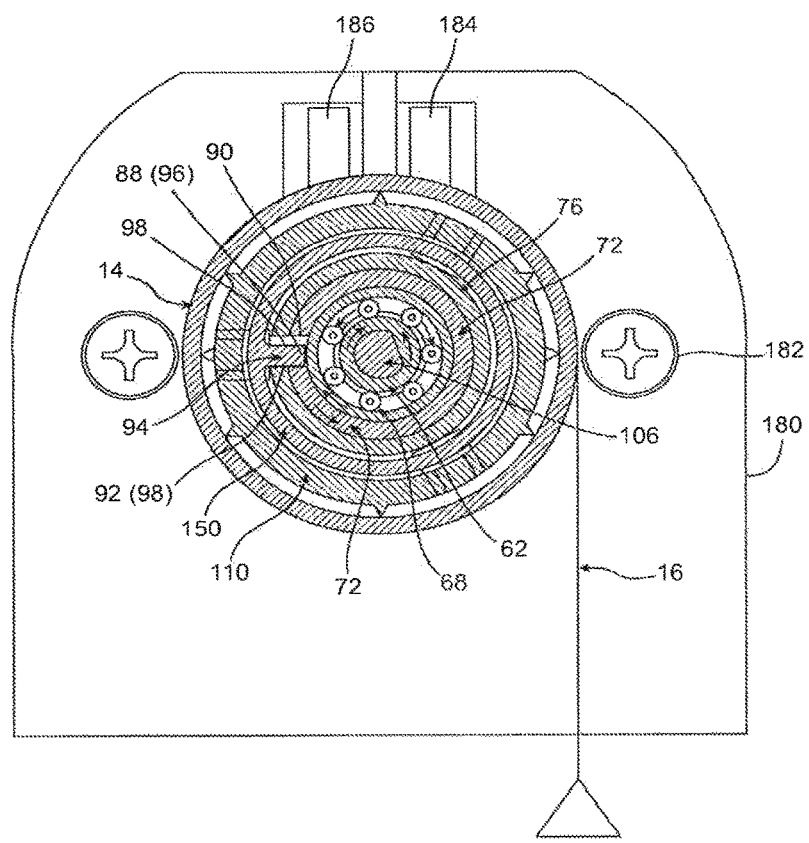
FIG. 9 illustrates a magnified version of FIG. 7d, illustrating the torque limiter coupling and the distal side bracket in the background.
Figure 10:
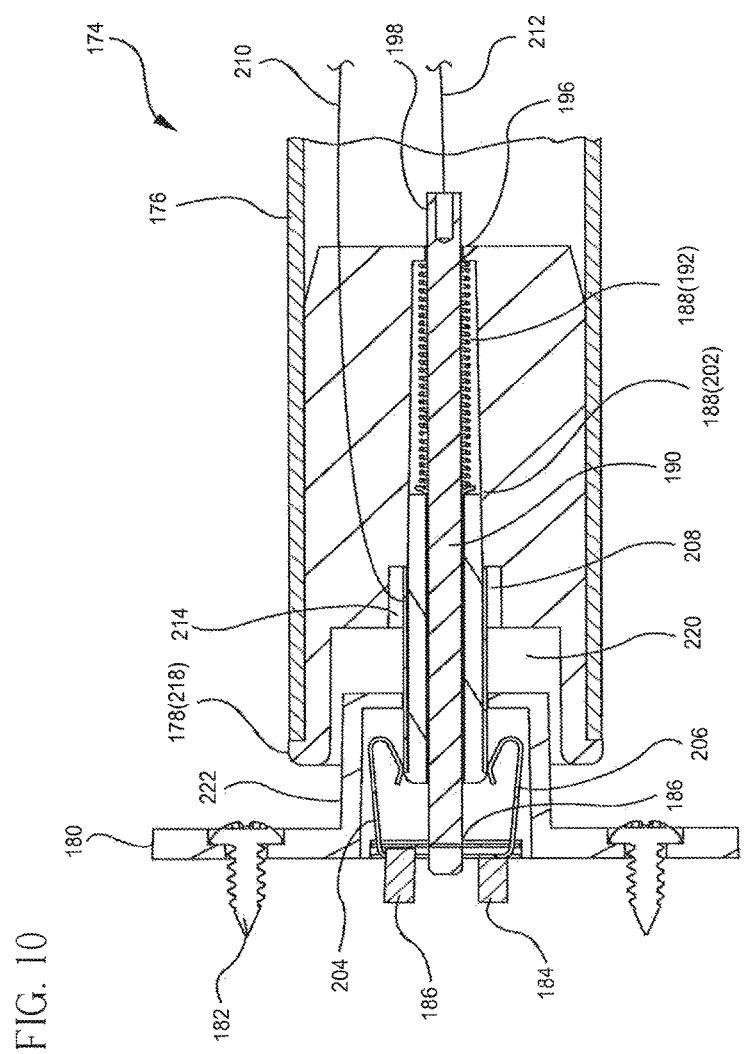
FIG. 10 illustrates a magnified cross sectional view of the distal end of the assembly as illustrated in FIG. 7c, which illustrates the quick-release slip-ring.

Illustrated in FIGS. 6, 7 and 10, is a quick-release slip-ring 174 which carries power to the spinning motor 102. Such a slip-ring 174 serves as an electrical and mechanical disconnect point for the blind. The electrical connection is provided between a rotating slip-ring housing 176, at its distal end 178, and a stationary slip ring bracket 180, which is attached to an architectural opening via, e.g., screws 182.

Within the stationary bracket 176 is a spring contact 184 and a flat contact 186, electrically separated from each other. One of these contacts is a hot contact and the other is a neutral contact. These contacts are positioned within a cavity 188 in the stationary bracket 176, similar in type to the cavity 168 in the tube bracket 120.

Radially centrally disposed within the rotating housing 176 is a spring mounted nickel coated brass pin 190, with an associated compression spring 192 and spring seat 194 fixed at an axially intermediate location on the pin 190. A radial opening 196 in the proximate side of the housing is large enough to allow a proximate end 198 of the pin 190 to pass, but not the spring 192. As such, the spring action occurs between the radial opening 196 and the spring seat 194, forcing the pin 190 in the distal direction from within the housing 176.

An insulating nickel coated brass sleeve 200 fixed at the distal end of the housing 178 has a proximate edge 202 against which the spring seat 194 comes to rest, restraining the pin 190 within the sleeve. 200 and rotating housing 176. When the slip-ring 174 is connected to the stationary bracket 180, the spring 192 forces the distal end 202 of the pin against the flat contact 186.

The spring contact 184 comprises two contacts 204, 206, each extending axially from the cavity 188 and each bent radially inward to press against an exposed portion of a brass sleeve 208 on the outside of the insulating sleeve 200. Wires 210, 212 are soldered to respective points 214, 216 on the proximate end of the pin 190 and along a proximate end of the axial length of the brass sleeve 208. The solder point 214 on the brass sleeve 208 is positioned far enough towards the proximate end of the sleeve 208 to not obstruct axial motion of the contacts 204, 206 against the sleeve 208, discussed below.

When installed, an electrical connection exists between the contact 186, the pin 190 and the wire 212. An electrical connection also exists between the contact 184, the brass sleeve 208 and the wire 210. The wires connect to the motor for completing the power circuit. One of the wires is connected to the hot contact on the motor and one is connected to the neutral contact on the motor. Their connection to the pin and brass sleeve depends on which of these conductive members will be connected to the hot contact or neutral contact at the stationary bracket 180, which is determined in advance.

The rotating housing 176 includes a distal end lip 218, serving the same purpose of the proximate end lip in the end cap 110. An axially extending cup-shaped cavity 220 in the rotating housing 176, which opens towards its distal end 178, is radially large enough to enable the contacts 204, 206 to flex against the brass sleeve 208.

The cavity 220 is axially deep enough to allow for axial play 222 between the rotating housing and stationary bracket 176, 180 to account for variations in bracket spacing, which is a function of the size of the architectural opening. For the same reason, the axial length of exposed portion of the brass sleeve 208, distal from the solder point 214 for the wire 212, matches that of the depth of the cavity 220. Similarly, the reach, from the pin 190 to the flat contact 186, accounts for the same variations in axial play.

Accordingly, the above disclosed embodiment provides a quick-release slip-ring which is capable of powering a roller blind motor without hard wiring the blind motor to wires at an architectural opening. This configuration enables installing and removing motorized roller blinds much more quickly and easily than with typical connections.

Window-Sized Unitary Solar Energy Collector

Figure 11:
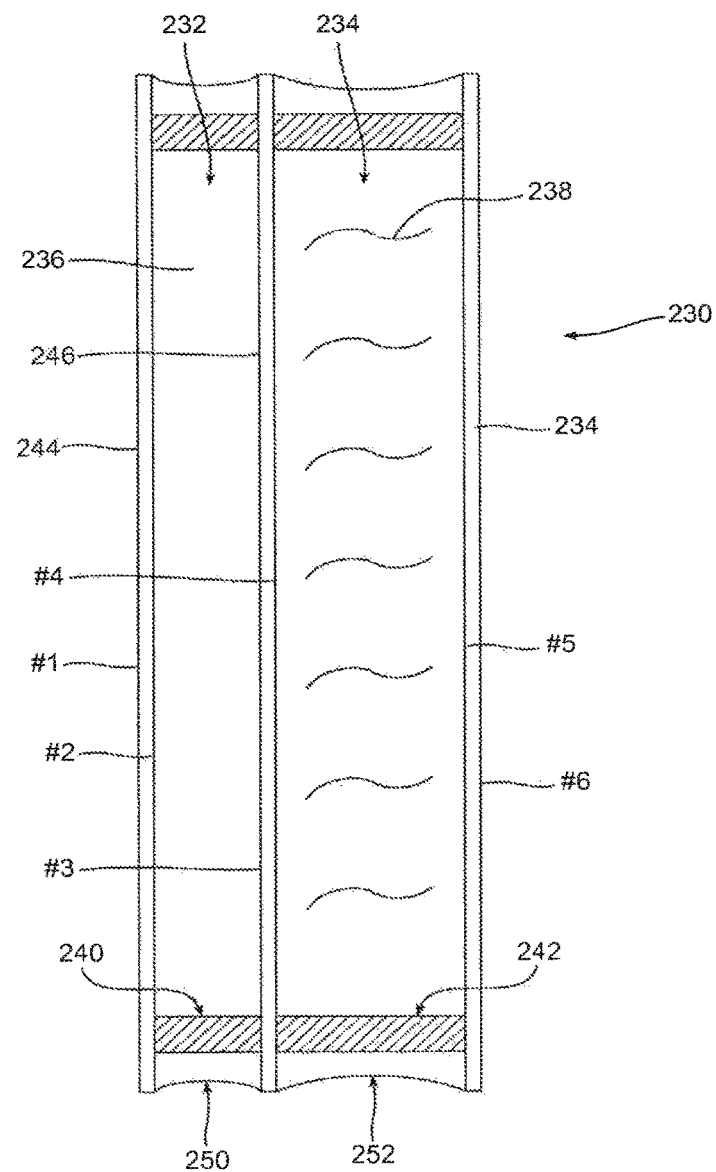
FIG. 11 illustrates a triple glazing with a gel fill for heat storage and dissipation.

Turning to FIG. 11, the solar storage device is a passive heating system 230 comprising a sealed glazing unit with two sealed cavities 232, 234, where the first sealed cavity is on the exterior side of the unit and the second cavity 234 is on the exterior side of the unit. This configuration is not to be confused with common triple glazings for insulating purposes, where each cavity is configured primarily to achieve an optimal thermal resistivity ("R" value). In this unit, the first cavity 232 is typically filled with a noble gas 236, krypton, etc., and is the insulating component. The second cavity 234 is filled with an aqueous medium 238 and sealed, and is the thermal storage component. In this triple glazing, the interior cavity is configured primarily to achieve an optimal thermal capacitance ("C" value).

Spacers 240 in the first cavity 232 contain a desiccant while ordinarily spacers 242 in the second cavity 234 would not. Spacers 240 in the first cavity 232 would be designed to minimize heat flow, while that is less important in the second cavity 234.

The outer, or first, lite 244 is typically glass of a low iron type to maximize solar gain. The #3 surface has a low-e coating on it, so that the second lite 246 is a low-e type. The inner, or third lite 248 is a standard Clear, or is tinted.

The aqueous medium 238 is a hydrogel which has cohesion characteristics enabling it to adhere to the #4 and #5 surfaces, which are separated by the spacer 242, where the spacer is formed from a glass material attached to surface #4 and #5 by an acrylic adhesive. As compared with a foam spacer, a spacer formed form glass would be without the gases which can otherwise become trapped in the foam spacer and which could migrate into the gel space, which could adversely impact the performance of the system.

Further regarding the aqueous medium, such a suitable medium for this purpose would be comprised primarily of sodium polyacrylate and water—a hydrogel in which water is partially solidified between adjacent lites 246 and 248. In such a hydrogel, water is contained within a substantially dilute crosslinking system exhibiting very little to no flow in a steady state. Such a hydrogel could be filled into the cavity in a degassed liquid state, and later gelled. Furthermore, a microencapsulated phase change material could be added to the hydrogel to boost its heat capacity.

A product containing the suitable cohesion and UV characteristics is manufactured in the art of fire resistive panels by SAFTI FIRST, of San Francisco, Calif., USA. Specifically, SAFTI FIRST manufactures a product under the name of SuperLite II-XL (one hundred and twenty minute rating). In its typically manufactured form, this product has a thickness of just 1¼-1½ inches and is clear.

While the inventors found the SuperLite II-XL product to be relatively serviceable, SAFTI FIRST modified the SuperLite II-XL for purposes of application in the present invention by request of the inventors, to provide the following characteristics, wherein the numbering is not intended to identify the relative level of importance of any one characteristic: (1) an aqueous gel 1¼" thick with at least 80% water content; (2) an aqueous gel with mechanical stability of between 120 degrees Fahrenheit and 160 degrees Fahrenheit; (3) an aqueous gel with UV stability capable of 1500 hours in a QUV chamber without yellowing or discoloring or the formation of bubbles or voids; (4) an aqueous gel with a thermal stability such that no yellowing or discoloring happens during repeated cycling of temperatures between 40 degrees Fahrenheit and 160 degrees Fahrenheit; and (5) an aqueous gel that is adhered to the glass lites such that the gel is supported by the glass. In addition, the fire retardants were not added to the formula, which may have otherwise contained such substance. This resulting product proved to be well suited for the application of the disclosed embodiments because of, for example, its relative UV stability.

A suitable glass for the second lite 246 is a tempered Pilkington Energy Advantage™ low-e glass. This glass is obtainable from Pilkington North America Inc., Toledo, Ohio, USA. The Pilkington Energy Advantage™ low-e glass is designed to provide a high light transmittance and a high solar transmittance, allowing more of the sun's rays to enter the gel 238 as solar energy, which can be converted into usable heat.

The third lite 248 comprises PPG Graylite-Fourteen, obtainable from PPG Industries, Inc., Harmarville, Pa., USA. The PPG Graylite, as compared to the other lites in the passive heating system 230, absorbs a high percentage of the incoming energy, both visible and infrared. As with the glass used for the second lite 246, the PPG Graylite-Fourteen glass blocks a significant amount of UV energy so as to prevent interior fabrics from fading. The absorption of incoming energy serves to further heat the gel, such heat to be stored in the gel for later. It also serves to minimize the sunwashing effect, discussed earlier.

An alternative to Greylight-Fourteen for sunwashing control would be to tint the gel itself with silver nitrate, which readily mixes with water and forms a suspension of colloidal silver particles. Silver nitrate may be added in appropriate amounts to the aqueous polymerizable solution used to fill the cavity 234 between lites 246, 248.

With the gel 238 adhering to the #4 and #5 surfaces, the sealed heat storage part, or cavity 234, can be manufactured to a very large size. Since the sealed insulating cavity is the same size as, and integral with, the heat storage cavity, having a large heat storage cavity 234 enables the use of an equally large sealed insulating cavity 232. This minimizes the number of glass elements, seals, the risk for failure, costs, undesirable appearance, and thermal shorts. This is an alternative to other systems, in which glass blocks containing water were limited in size and in height to about two feet, requiring an extensive array of dividers and separate sheets of glass.

Turning to the insulating cavity 232, a suitable first lite 244 would be a high-gain glass, having a solar heat gain coefficient (SHGC) of seven-tenths or greater and preferably about nine-tenths. A Pilkington Optiwhite, low iron glass can be used as the first lite 244 in the passive heat system 230. The Pilkington Optiwhite provides a high light transmission (i.e., it is ultra clear) and high solar heat transmittance, and it is sealable.

The spacer 240 between the first lite 244 and the second lite 246 is a Super Spacer™ type from Edgetech USA, Cambridge, Ohio, USA. The spacer 240 is engineered, all foam, "NO-Metal" technology and is dual sealed (that is, sealed against the #2 and #3 surfaces), warm edge spacer system that uses a high-performance acrylic adhesive for its primary seal, backed by a moisture vapor seal 250 (discussed in greater detail below) acting as a secondary seal. The all foam construction of the spacer 240 is non-conductive, blocking heat flow through the window, providing an optimum thermal performance. Spacer 242 is manufactured from glass, such as clear float glass, and is about a quarter of an inch thick, rather than the silicone spacer typically available with the SuperLite product. Spacer 242 is a primary seal that is also backed by a moisture vapor seal 252 (discussed in greater detail below) acting as a secondary seal.

The size of the spacer 240, corresponding to the space between lites 244 and 246 is substantially the same as typical spacing between lites in a double glazing. The first cavity 232 is filled with a noble gas, such as argon or an argon/krypton mixture so as to provide insulation from exterior temperatures. The separation would be about one half of an inch for argon, three-eighths of an inch for krypton, or one-quarter of an inch for xenon. Typically, the insulating cavity 232 is ¼-½" in depth, with a correspondingly sized spacer 240. Further, the heat storing cavity 234 is typically ½-4" in depth, with a correspondingly sized spacer 242.

Sealants 250, 252 are provided about the perimeter of the cavities 232, 234. The sealants are manufactured from, e.g., one part Silicone, two part silicone, polyisobutylene (a.k.a., butyl rubber), hot melt butyl, polyurethane, polysulfide, and acrylic latex. The sealant enables the spacers 240, 242 to make a firm, airtight seal.

Figure 12:
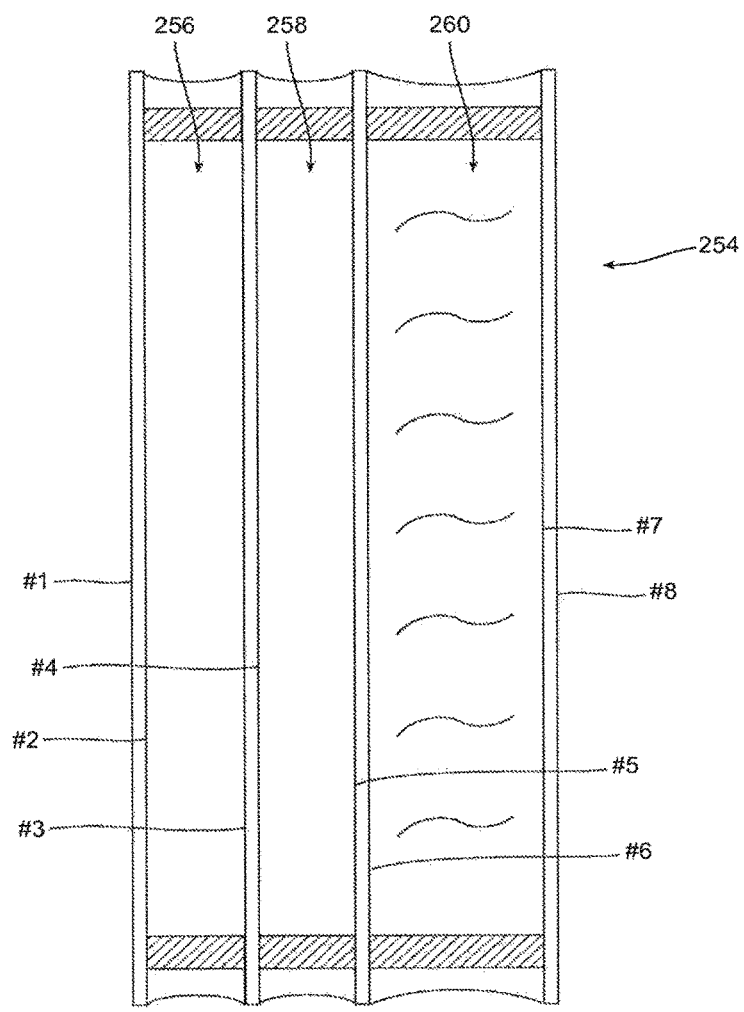
FIG. 12 illustrates a quad glazing with a gel fill for heat storage and dissipation.

Turning to FIG. 12, there is illustrated a further embodiment of the thermal storage device, which is a quad glazing 254 (four lites) configured with two thermally insulating cavities and one thermal storage cavity. That is, the IGU here, designed for colder climates, has two separately sealed exterior-side insulating cavities 256, 258 filled with krypton or the like, and one interior sealed cavity filled with the hydrogel 260.

The two exterior lites are the same as the exterior lite in the first embodiment and the third and forth lites are the same as the second and third lites in the first embodiment. The seals and spacers about the middle cavity would be the same as in the exterior insulating cavity while those about the interior cavity would be the same as those previously disclosed on the interior cavity. The low-e coating would be used on the #5 surface (surfaces #1-#8 exist in this embodiment) for minimizing radiant heat loss and transferring solar energy efficiently to the thermal mass in direct thermal connection with it.

Array of Individual Solar Heating Cells

Figure 13A:
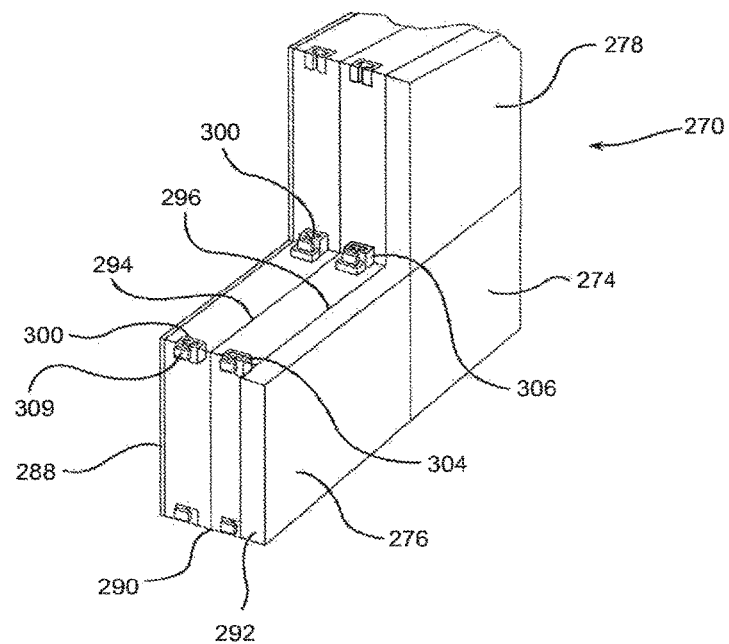
FIG. 13A illustrates a heat storage block configuration, partially assembled, from an interior perspective.
Figure 13B:
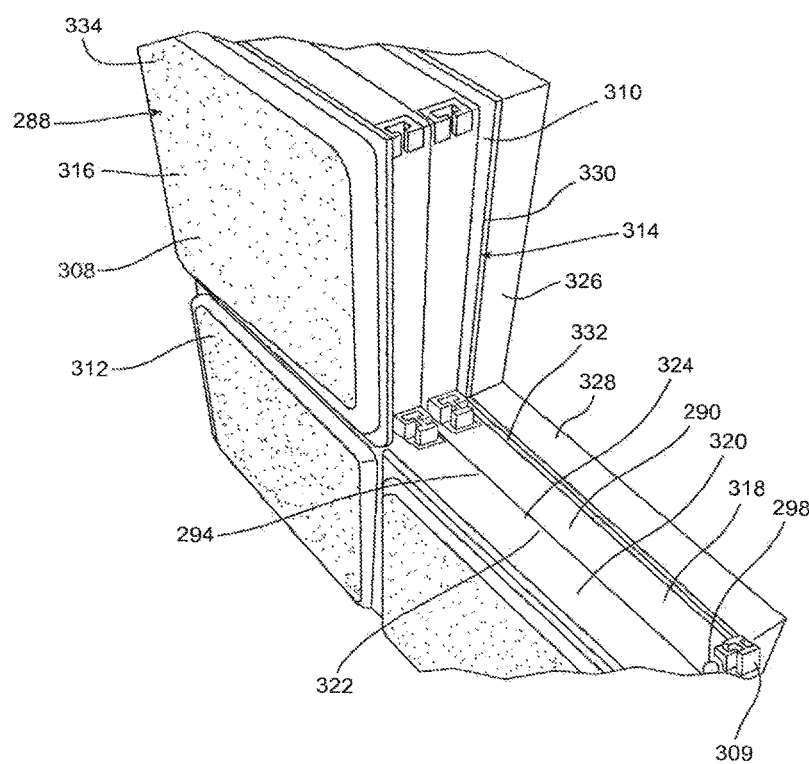
FIG. 13B illustrates a heat storage block configuration, partially assembled, from an exterior perspective, including a heat-absorbing mask on the exterior side.
Figure 13C:
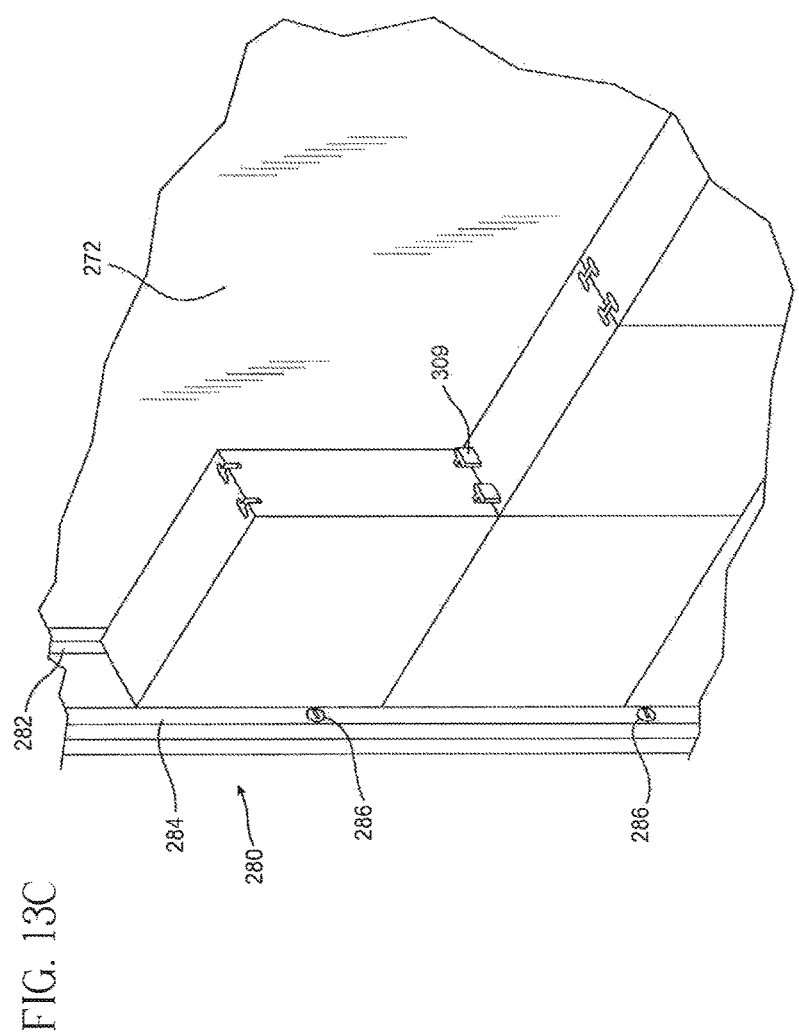
FIG. 13C is a schematic illustration of a heat storage block configuration, partially assembled, from an interior perspective, against a glazing on the exterior side.
Figure 14:
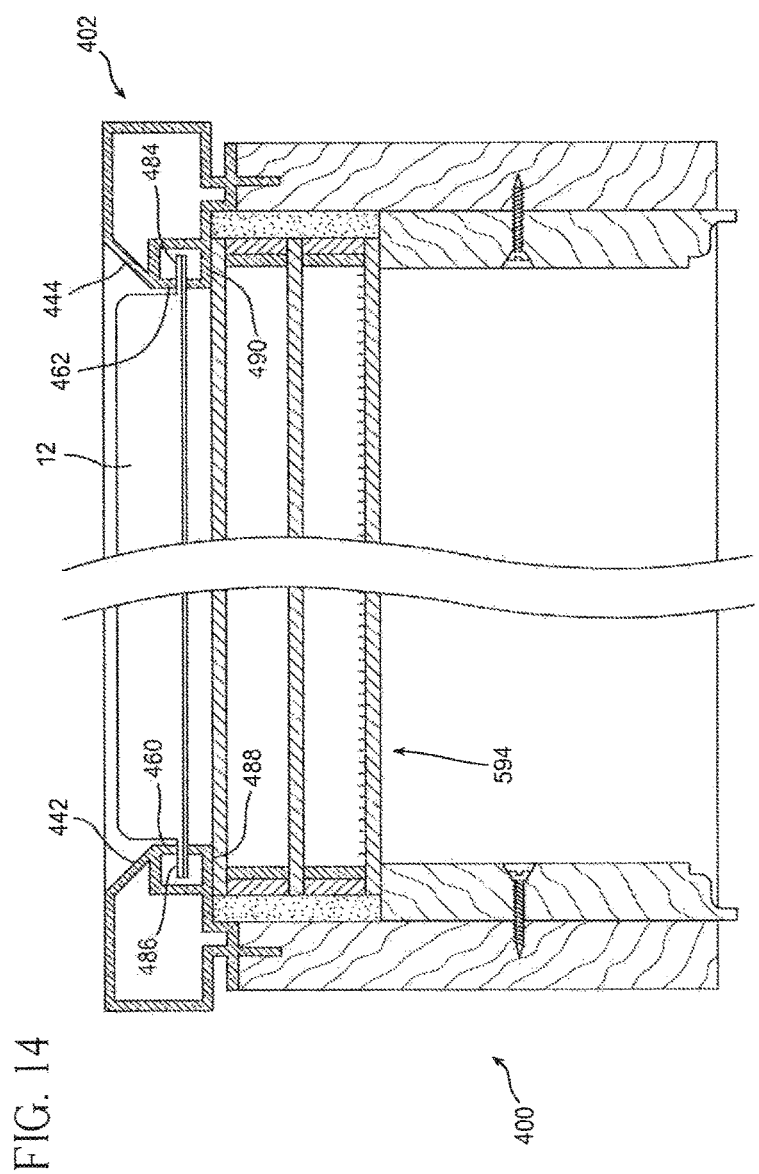
FIG. 14 illustrates a top sectional view of a unitary assembly for an architectural fenestration, which provides dynamic solar heat gain control, and which includes a slatted blind, and a triple glazing window.
Figure 15:
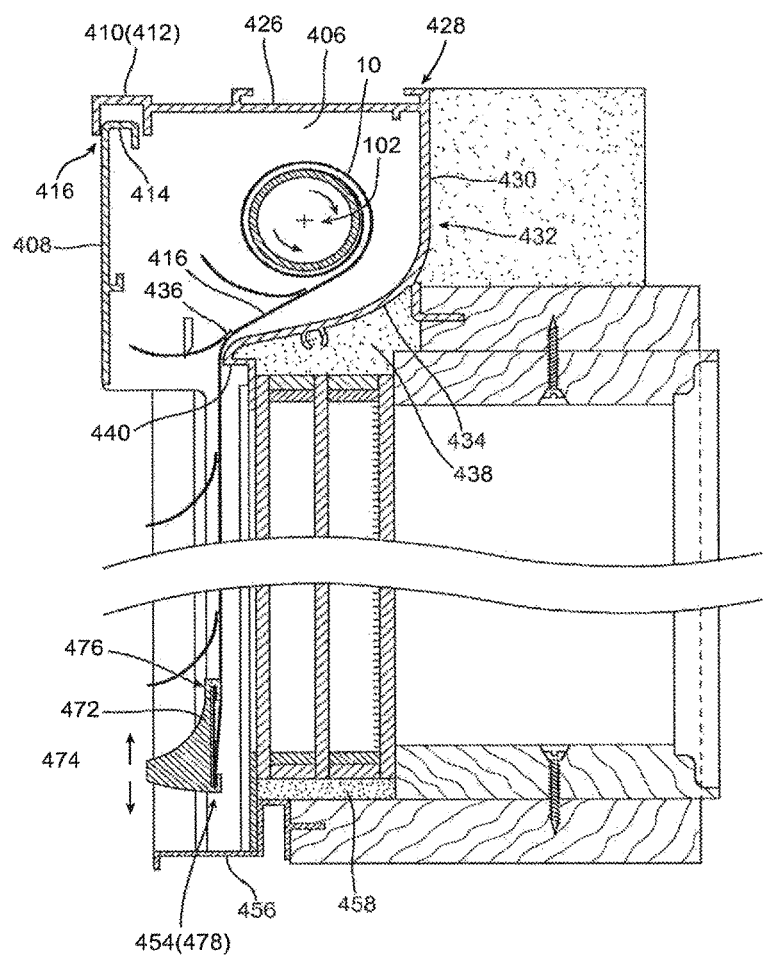
FIG. 15 illustrates a side sectional view of the assembly of FIG. 14, where the blind fabric is unwound.

Turning to FIGS. 13A-C, these figures are based on the solar heating blocks in the incorporated patent document. These figures illustrate a panel 270 of blocks from inside the building, where the panel 270 sits behind one or more layers of insulating glass, e.g., glazing 272 (in schematic FIG. 13C), having southern exposure. The illustration provides three stacked heating blocks 274, 276, 278, e.g., forming a partial array or matrix (rows/columns) of solar heating blocks. Such a partial stacked configuration would exist, e.g., midway through an installation. As disclosed herein, the blocks interlock with one another to provide some structural integrity to the panel 270 as a whole The glazing 272 and panel 270 are mounted in a common frame 280 (in schematic FIG. 13C), where the panel 270 is flanked between glass stops, e.g., glass stop 282, and block stops, e.g., block stop 284, on its opposing side edges as well as opposing top and bottom edges (not illustrated). As with typical stops, the stops 282, 284 can be made of wood and positioned with screws 286 to ensure structural integrity. For reasons discussed below, the top block stop would be removably positioned (e.g., with accessible screws) while the other stops can be permanently fixed in place.

Each solar heating block comprises a block body having three sections 288, 290, 292, which effectively slices the block in two vertical planes, so as to provide an externally facing section 288, a middle section 290 and an internally facing section 292. The block body, including all sections, is molded plastic, such as an acrylic plastic, and the sections are heat-welded or sealed together, forming inner and outer weld seams 294, 296, to produce a watertight connection.

More specifically, the exterior and middle sections are formed from clear or transparent plastic to allow for a maximum transmission of energy from the low-e glazing disposed at the exterior side of the block. The interior section is formed from translucent/white plastic which allows for a soft-white transmission of visible light.

Each block section is formed with a relatively small wall thickness such that the block body, when assembled, forms an internal cavity (not illustrated). The cavity is filled with water fed through an opening 298 in a corner of the middle section 290 of the block. Before sealing the opening 290, the water filled block is heated to one hundred and sixty degrees for an extended period of time (e.g., several hours) at typical room pressure, until dissolved gas in the water has been brought to a minimum level, in a process akin to degassing. Then, while still warm, the opening 298 is sealed. It has been found that a relatively small amount of air bubbles will form in a block manufactured this way.

Regarding the water, a light diffusing agent may be used to color the water white or some other hue. This provides a pleasant affect when viewed through the translucent/white plastic. Furthermore, the water may include antifreeze and antimicrobial agents. For example, the water may include table salt (sodium chloride) or calcium chloride, which function both as antifreeze and antimicrobial agents. In addition, distilled water may be used to minimize the mineral and microbial content of the water being used to fill the block body.

Weight of the water limits the size of the block body. Accordingly, with a generally square body of perhaps eight to twelve inches on a side (in a front view), a total thickness of three to six inches is acceptable. Otherwise, the block may become overly heavy and unwieldy, and may generate a large hydrostatic pressure which could result in a leak.

Each block includes eight T-slotted sockets or feet, (four on top, four on bottom), e.g., 300, 302, 304, 306. Fitted into the slots are I-shaped peg connectors 309, which extend into and out of the slots by about a quarter of an inch. Accordingly, each I-peg connector can connect four adjacent feet in a matrix of blocks. The I-peg connectors are softer than the block material, and the flexibility of the I-peg connectors provides a tight relationship between blocks in adjacent columns and aligns blocks disposed in a common row.

A forward lip 308 of the exterior facing section 288 and a rearward lip 310 of the middle section extend outwardly to cover the same plan area as covered by the feet 300-306. That is, the cross sectional shape of a squared "U" is created with the rear surface 312 of the front lip and the front surface of the rear lip 314 on the outside of the "U." The bottom of the "U" is formed by the side surfaces 318, 320 of the front and middle bock sections. The feet in the front section 288 are against the rear surface 312 of the front lip 308 while the feet in the middle section 290 are against the front surface 314 of the rear lip 310.

It is to be appreciated that, but for the front face 316 of the forward block section 288, the middle section 290 and forward section have the same shape and can therefore be manufactured from molds having essentially the same shape. Due to the similar structural configurations, an installer need not be concerned with the top or bottom orientation of the blocks during assembly of the panel.

Furthermore, due to the similar structural configurations with the front and middle sections 288, 290, the fill hole 298 can be drilled out of the corners of the side surface 318 of the middle block section or the side surface 320 of the forward block section (not illustrated). Such drilling can occur before or after the block sections are manufactured.

The rear section 292 has a constant plan area, e.g., when viewing from the rear, which covers the plan area defined by the outer edges of the lips 308, 310. As such, side surfaces of the rear section, e.g., vertical surface 326 and horizontal surface 328, are welded to the outer edges of the rear lip, e.g., vertical edge 330 and horizontal edge 332, forming the rear weld seam 296. The combination of these outer side edges and surfaces provide the block with a sturdy surface suitable for stacking purposes.

When installed, the top layer of feet in the top row of blocks is not equipped I-pegs. In order to disassemble the block panel, the top block stop is unscrewed and removed. Then, each block in the top row of blocks is lifted, one by one, until the block clears the I-pegs in the top layer of feet in the immediately lower row of blocks. It is to be appreciated that a certain amount of space is required above the top row blocks to achieve this lifting. That space is hidden by the top block stop. To remove the side blocks in the top row, the adjacent blocks are lifted and removed, and then the side blocks are lifted, slid towards the center, and removed. Sliding to the center is required to clear the vertical (side) block stops.

A heat-absorbing mask 334 can be adhered to the exterior side of each block, before assembly of the panel. The heat-absorbing mask may be a perforated plate which is black on one side and white, or some other light color, on the other side. The perforations take up from twenty to fifty percent of the area of the heat-absorbing mask, so that the area not represented by the perforations is between fifty and eighty percent of the total area. The heat-absorbing mask is oriented so that the black side faces the low-e glazing, while the white or light side faces inwardly toward the interior of the building. As such, the heat-absorbing mask absorbs light energy while the white surface dims the light, and both occur without coloring the light.

Self-Correcting Track-Based Frame Structure

As indicated, the present patent document is directed to a unitary assembly for an architectural fenestration, which provides dynamic solar heat gain control. Various disclosed embodiments include a track-based frame structure and blind combination in which enables the blind to be self-correcting, should the blind material 16 fall or be pulled outside of the track. One such frame assembly is illustrated in the figures, starting with FIGS. 14-17.

The assembly 400 includes a frame 402, which is made from aluminum, includes a header housing 402. On opposing internal sidewalls of the header housing including, e.g., wall 406, are the brackets for removably mounting and powering the blind motor, disclosed above. A removable faceplate 408 is provided as a protective element for enclosing the blind within the header housing 402. The faceplate 408 can be clipped to exterior surfaces of the housing.

The housing 402 includes a vertically downwardly facing channel 410 at its top-exterior edge 412, adapted to receive a channel 414 of the same shape and orientation at the top edge 416 of the faceplate 408. The second channel 414 differs from the first 410 in that it is smaller and is therefore capable of fitting within the first.

When the faceplate is installed, the bottom edge of the faceplate rests on pegs on the housing (not illustrated), which prevents the faceplate from dropping vertically past the position illustrated in the figure. Accordingly, at rest, the faceplate channel 414 remains within the housing channel 410. The illustrated vertically oriented gap between the channels 410, 414 enables lifting the faceplate away from the pegs during installation and removal. During removal, for example, the ability to lift the faceplate off the pegs enables pitching the faceplate away from the housing and thereafter removing the faceplate from the housing.

Figure 17:
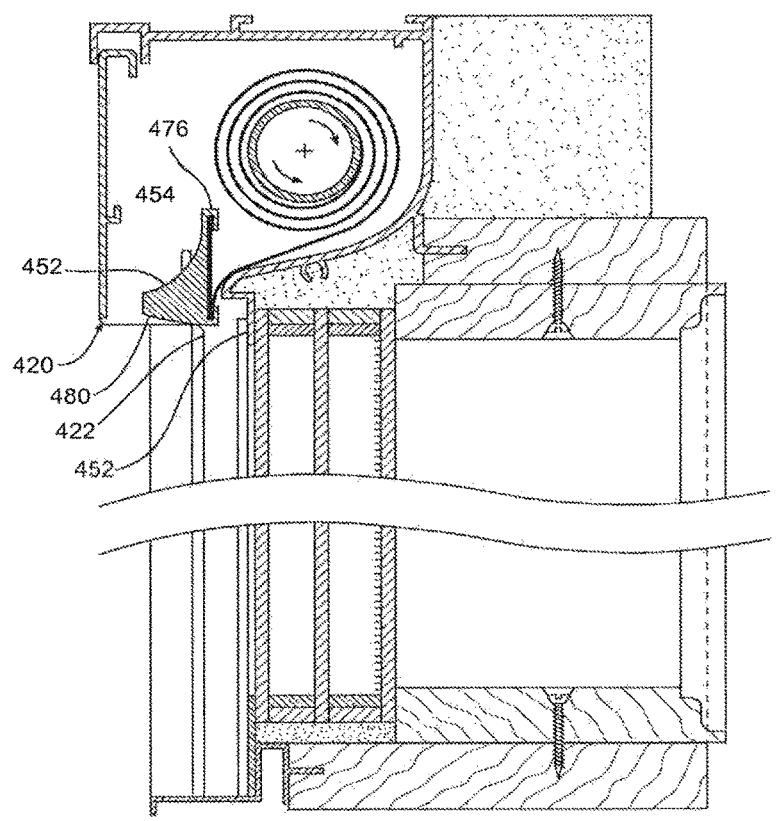
FIG. 17 illustrates a side sectional view of the assembly of FIG. 16, where the blind fabric is retracted.
Figure 18:
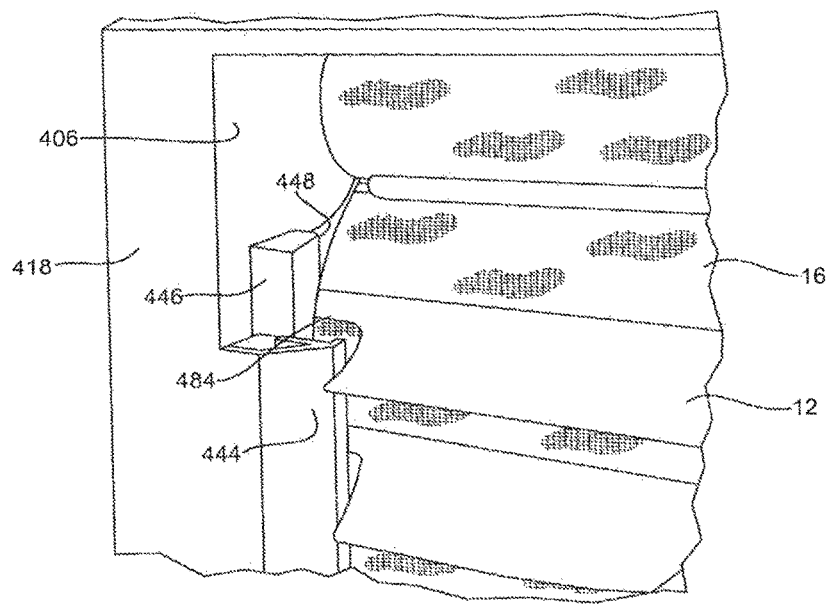
FIG. 18 illustrates the embodiment of FIG. 14-17, with the blind fabric unwound in a track.

The blind 10 is recessed within the header housing 404 such that exterior surfaces of the housing, e.g., exterior surface 418 in FIG. 18, along with the channel 410 provide a base for seating the 408. The 408 is large so its bottom edge 420 extends below a bottom surface 422 of the bottom rail 424 of the blind when retracted (FIG. 17).

The header housing 404 has an essentially horizontal top member 426, extending, rearward, e.g., towards the interior of the opening, from its top edge 412. At a rear edge of the top member 428, the header housing 404 turns downward at a right angle. A rear-vertical member 430 of the header drops to a point 432 at which it turns forward with a curvature that is essentially a quarter-round surface 434. The amount of drop in the rear surface 430 and the location of the curved surface 434 is such that these surfaces do not touch the installed blind 10 at any time, whether or not retracted.

Forward of the curved surface 434, toward the front (exterior) of the header housing 404, is an additional curved surface which is also substantially a quarter-round surface 436, serving as a transverse alignment guide. This transverse alignment guide 436 is the part of the header housing 402 with which the installed blind material 16 connects throughout the winding and unwinding process. The intermediate surface 438 connecting the rear of the housing with the transverse alignment guide 436, is inclined downwardly towards the transverse alignment guide 436 to ensure that this surface 438 does not contact the blind material 16 during operation of the blind.

Figure 19:
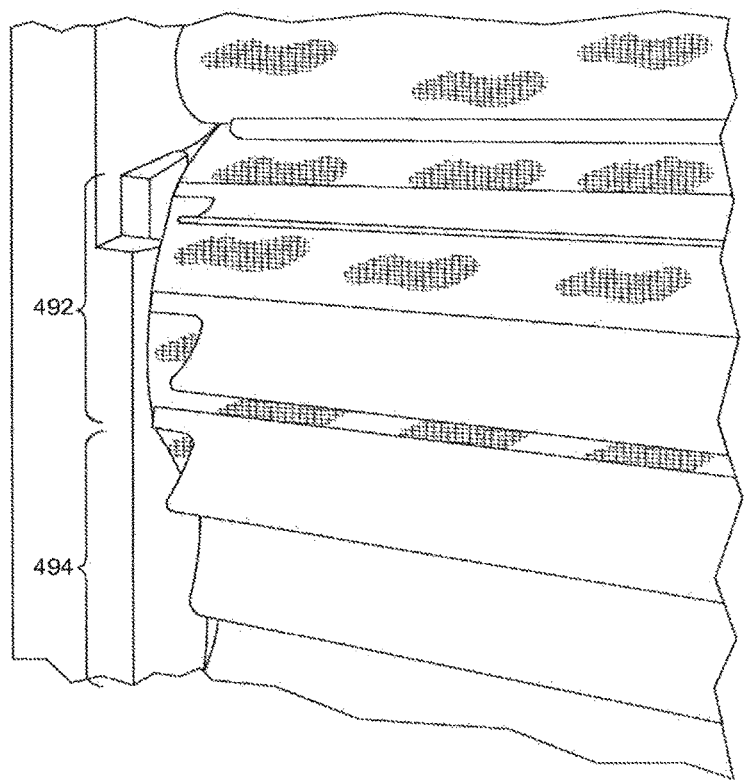
FIG. 19 further illustrates the embodiment of FIG. 14-17, with a portion of the blind pulled from the track.

A forward edge 440 of the transverse alignment guide 436 is over a pair of side tracks 442, 444 such that blind material 16 is guided downwardly into the tracks 442, 444. In addition, a pair of opposing vertical guides, e.g., guide plate 446 in FIGS. 18 and 19, center the blind material 16 widthwise so as to align the blind material 16 when entering the opposing tracks. The guides, e.g., guide 446, which are mirror images of each other, project rearward into the housing 404 and are essentially rectangular, where the rear edge 448 is rounded toward the respective side wall in the housing, e.g., wall 406.

Figure 16:
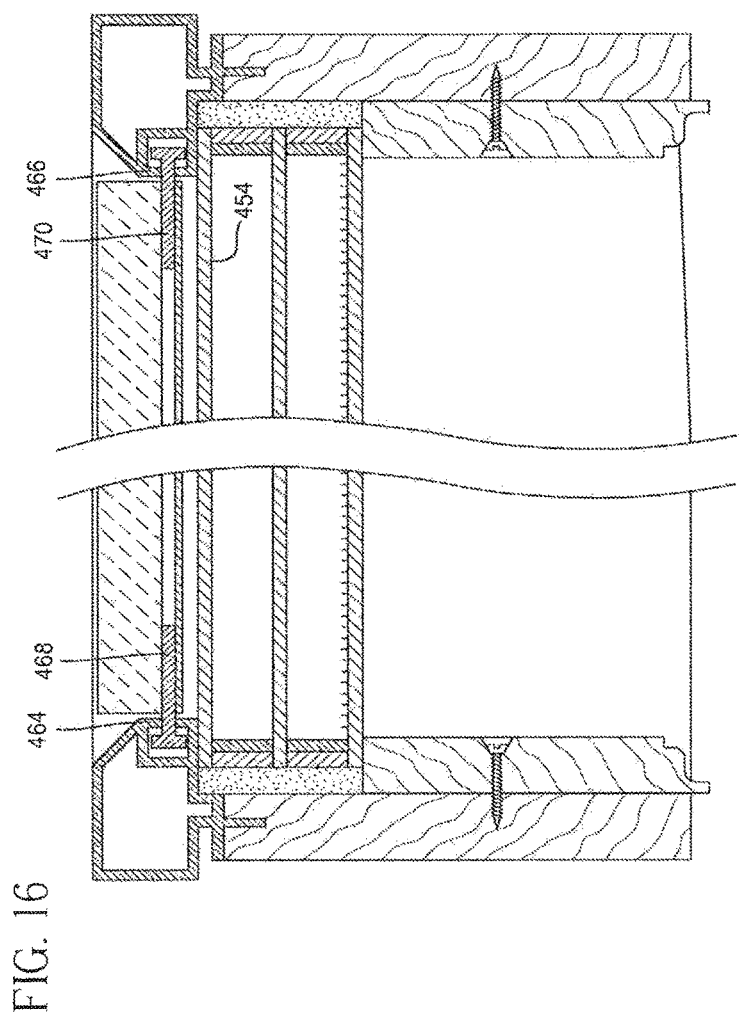
FIG. 16 illustrates a further top sectional view of the embodiment in FIG. 14, with the sectional view illustrating the structure of the bottom rail.

Extending rearward from the forward tip of the transverse alignment guide 436 is a stop-surface 452 for mating with a rearward overhang 454 integrated into the bottom rail. The bottom rail overhang 454 extends between opposing ends of the bottom rail, but not into the tracks 442, 444 (FIG. 16). The bottom rail overhang 454 extends rearward, past the drop line for the blind material 16. The mating of the stop surface 452 with the overhang 454 defines the maximum vertical retraction of the blind to (FIG. 17). For this reason, the bottom rail overhang 454 is essentially at the bottom edge 24 of the blind material 16 allowing maximum retraction into the header housing 404.

Turning more specifically to the tracks 442, 444, the bottom of the tracks is defined by the bottom exterior frame 456 of the assembly, is below the bottom edge 458 of the glazings so as to enable fully covering the glazings. Each track 442, 444 forms a square "C" channel, with opposing openings 460, 462. Centers of the openings are in-line with the vertical drop of the blind material 16 and are large enough to fit elongated, widthwise vertically extending stems 464, 466 of "T" shaped track guides 468, 470 disposed within a matching elongated "C" channel 472 in the bottom rail. The interior cavity in each track "C" channel is large enough to fit heads of the "T" shaped track guides 468, 470, where the track guides 468, 470 are sized to securely hold and guide the bottom rail 424 during winding and unwinding operations.

The top end 476 of the channel 472 in the bottom rail 424 is formed so that it does not contact the stop-surface 452 in the header housing 404. On the other hand, as indicated, the bottom end 478 of the channel in the bottom rail 424 includes the rearward overhang 454 which contacts the stop-surface 452 in the header housing 404. This defines the maximum retraction of the blind into the header housing 404.

For decoration purposes, and for allowing water and ice, etc., to fall off the bottom rail 424, the front segment 480 of the bottom rail 424 is smaller than the rear segment, and a top surface 482, which connects the two segments, is curved to form, e.g., a partial "U" shape.

Turning also to the blind 10, illustrated in FIGS. 14 and 15-21, opposing side segments 484, 486 of the louvers 12 are notched so that these segments can, along with the roller blind material 16, travel in the tracks 442, 444 along with the track guides 468, 470 of the bottom rail 424. As such, the blind material 16 is wider, and the louvers 12 are longer, than the length of the bottom rail 424. It is to be appreciated that the roller tube 14 for the blind 10 is as long as the blind material 16 is wide.

Figure 20:
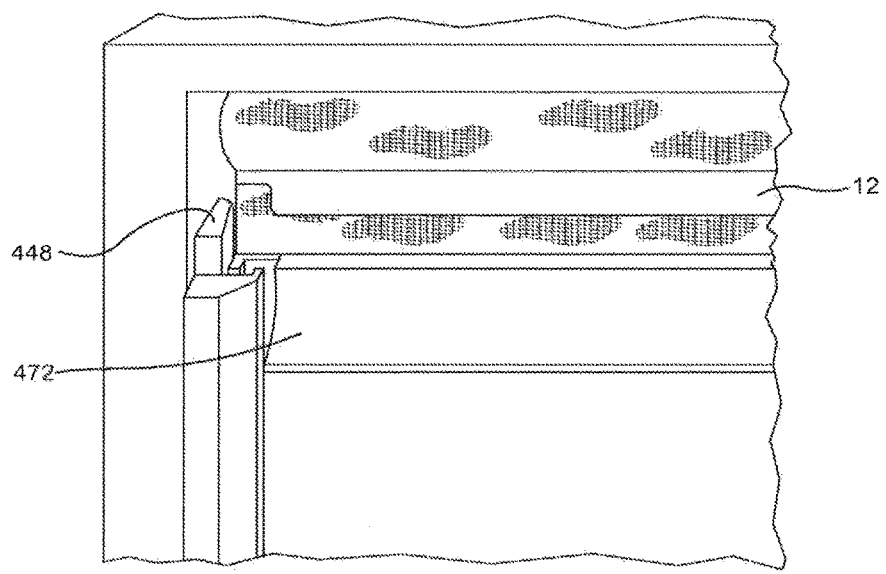
FIG. 20 further illustrates the embodiment of FIG. 14-17, with the blind retracted.

The above structure, with a glazing on the rearward side 488, 490 of the track channels, combines to form a system in which blind material 16 is self-correcting if the blind material 16 pulls out of the track in the exterior direction. For example, in FIG. 19, blind material segment 492 is out of the track while segment 494 is within the track. As illustrated in FIG. 20, the stiffness of the louvers 12 ensures that the blind material 16 will not hunch-up anywhere along the width of the blind material 16 during winding.

Figure 21:
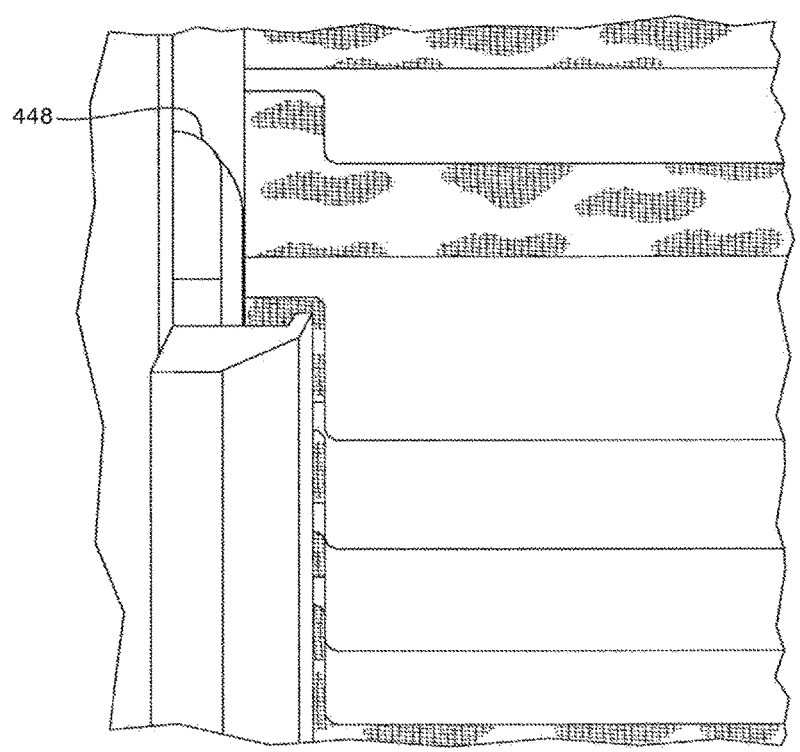
FIG. 21 further illustrates the embodiment of FIG. 14-17, with the blind fabric again unwound in the track.

Once the blind material 16 has been wound past the level where it has come out of the track, which may be at the bottom rail 424, the configuration of FIG. 20 would have been reached and the blind material 16 will have been fully re-aligned. That is, as illustrated in FIG. 21, once the motor actives to unwind the blind material 16, the material 16 will unwind from the roller tube 14, over the transverse alignment guide 436, and between side alignment guides, and thereafter properly reenters the track channels 442, 444. Accordingly, blind material 16 unwound at this point will be properly within the tracks.

As can be appreciated, a substantially planar transparent member other than a fixed glazing, such as a storm door, can be positioned against the rear of the track members and which would provide the same self-correcting aspects of the disclosed embodiments.

The Unitary Assembly—The Support Frame

Figure 22:
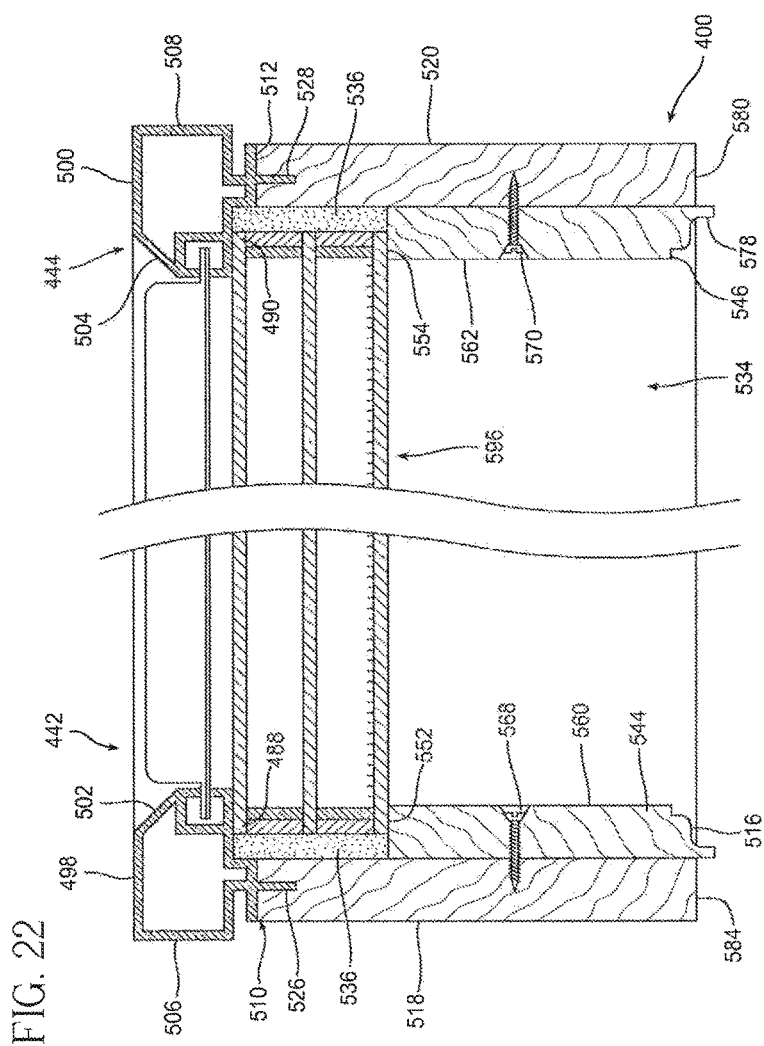
FIG. 22 illustrates a top sectional view of a unitary assembly for an architectural fenestration, which provides dynamic solar heat gain control, and which includes a slatted blind and a triple glazing window having a tinted interior lite.
Figure 23:
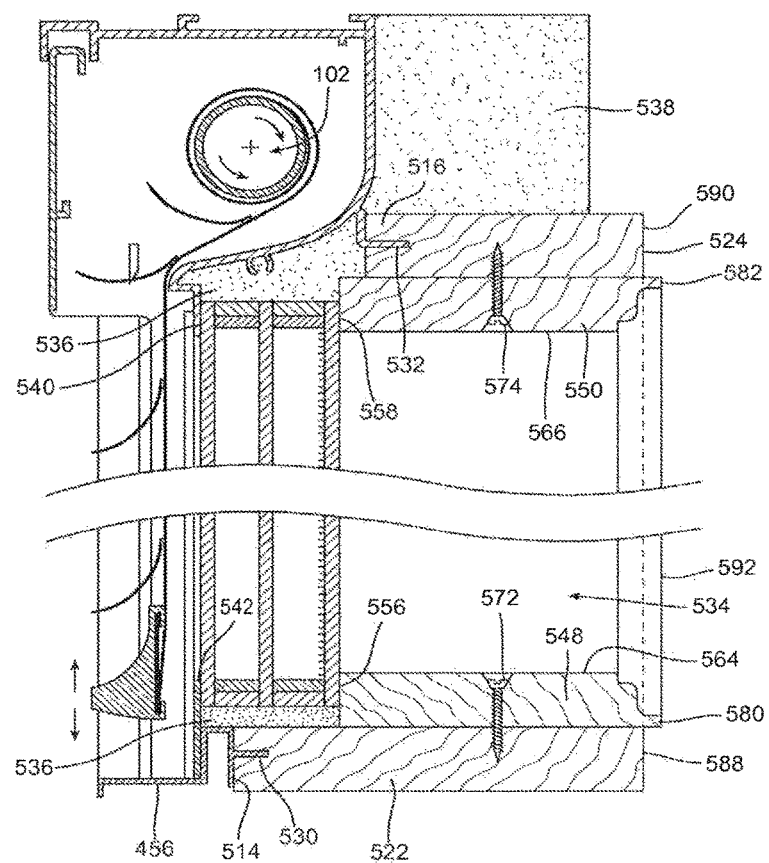
FIG. 23 illustrates a side sectional view of the assembly of FIG. 22.

Turning to FIGS. 22 and 23, the exterior face of the support frame 402 includes front surfaces 498, 500, which are forward of the tracks, 442, 444, are coplanar and extend away from each other. The front frame surfaces 498, 500 are connected to the opposing front surfaces of the tracks 442, 444 by respective angled trim/facia surfaces 502, 504.

The span of the front surfaces 498, 500, is such as to allow adjacently positioned assemblies 400 to connect on end surfaces 506, 508, which extend rearward at substantially right angles from the front surfaces 498, 500.

Four internally facing surfaces 510, 512, 514, 516, are provided for receiving four rectangular wooden insulating frame members 518, 520, 522, 524 on the interior side of the unitary structure. Two of those surfaces 510, 512 connect at substantially perpendicular angles to the end surfaces 506, 508 and extend to rear facing surfaces 488, 490 of the tracks. A third of these surfaces 514 is connected at a perpendicular angle to the bottom exterior frame 456 of the frame 402. A fourth of these surfaces 516 is connected to a rear face of the header housing 404, approximately where the rearward curved surface 434 meets the vertical interior member 430 of the header housing 404. Each of these rearward facing surfaces 510, 512, 514, 516 includes a rearward projecting bracket member 526, 528, 530, 532 which fits within a receiving channel (same location in the figures) in each frame member 518, 520, 522, 524. The brackets and channels are permanently adhered to each other.

The cavity 534 between the opposing frame members 518, 520, 522, 524, as well as internally exposed surfaces of the track 442, 444 and header housing 402, defines the volume for situating the glazings and heat storage components, introduced above and provided in alternative embodiments, below. The cavity 534 is larger than the size of the glazings so that the glazings can be further encased, on top, bottom and sides, in insulating foam fill 536. Additional insulating foam 538 is provided in the area rearward of the housing and above the top frame member. This foam 538 helps to keep horizontal the top frame member 524.

An adhesive glazing compound is layered between the connecting side surfaces of the #1 surface of the first lite of each disclosed glazing alternative and the rear face of the tracks at 488, 490. The glazing compound connects the #1 lite, at top and bottom ends, to a downwardly extending lip 540, connected to the rear edge of the stop-surface 452 and an upwardly extending lip 542, connected to the bottom exterior frame 456 of the system.

Four substantially rectangular glass stops 544, 546, 548, 550 are provided and sized such that a forward face 552, 554, 556, 558 of the glass stops sits at the interior (rearward-most) surface of the glazings and/or heat storage element, whichever is furthest rearward. Opposing surfaces 560, 562, 564, 566 of the glass stops are countersunk 568, 570, 572, 574 so that screws (same location) can set the glass stops to the opposing surfaces of wooden framing members.

Rear edges 576, 578, 580, 582 of the glass stops extend just beyond rear edges 584, 586, 588, 590 of the frame members 518, 520, 522, 524 and are provided with an edge profile, such as an Ogee styled edge known in the furniture industry, so that decorative edge members, e.g., member 592, can be installed. These edge members are the frame components visible to the interior occupant and define the rearmost surface of the assembly. However, should there not be enough meat in the glass stops to mill an edge profile, a square profile can be utilized and rear facia members can be omitted (see FIG. 29).

The above structure, along with the track and blind, defines the basic unitary frame and track structure for an architectural fenestration.

In addition to the motor controls discussed above, a thermostat can be provided on the interior side, mounted on a wall in the room where the glazing is located. The thermostat provides the dynamic component of the objective which is to utilize the unitary assembly to provide dynamic heat gain control to an architectural fenestration.

Specifically, the thermostat would communicate with the roller blind motor electronics and instruct the blind to unwind when the temperature in the room increases above an upper comfort level set point and wind the blind when the temperature in the room drops below a lower comfort level set point. By measuring the temperature in the room, the temperature of the thermal storage unit itself can reach a much higher level. This enables the thermal storage unit to store more energy which can be transferred to the room interior over a longer period of time.

Alternative Glazing and Blind Configurations

The above frame and blind configuration can be augmented with the disclosed glazing options as well as more generic glazing options. The configuration can also be configured with alternative roller blinds. These alternative configurations will now be disclosed with continued reference to the accompanying figures.

Triple Glazing

According to one disclosed embodiment, the unitary assembly for an architectural fenestration, which provides dynamic solar heat gain control, is that illustrated in FIGS. 14-17. This embodiment includes the above disclosed unitary frame and blind with notched louvers, driven by the disclosed motor, which is controllable by a thermostat.

The embodiment is fitted with a glazing 594 which is illustrated as a triple glazing. The particular triple glazing has essentially the same configuration and materials as utilized in the quad glazing configuration 254 disclosed in connection with the window-sized unitary solar energy collector. The low-e surface, as with the quad glazing 254, is the #5 surface.

Notably missing from this configuration, as compared with the quad glazing 254, is the heat storage chamber 258, including the disclosed gel 260 and fourth lite with the #7 and #8 surfaces. Accordingly, this embodiment will strongly heat an interior space when sun hits it.

Triple Glazing with Tinted Interior Lite

Turning to FIGS. 22 and 23, this alternative configuration is essentially the same configuration as illustrated in FIGS. 14-17. The glazing 596 in this configuration is essentially the same as the glazing 594 previously disclosed. The primary difference is that in this glazing 596, the third lite, which is the interior lite, is tinted. As compared with the previously disclose glazing 594, the tinted glass itself will become very hot when sun hits it. This heat will in turn, heat the interior space with less glare than with the glazing 594.

Triple Glazing with Generic Roller Blind

Figure 24:
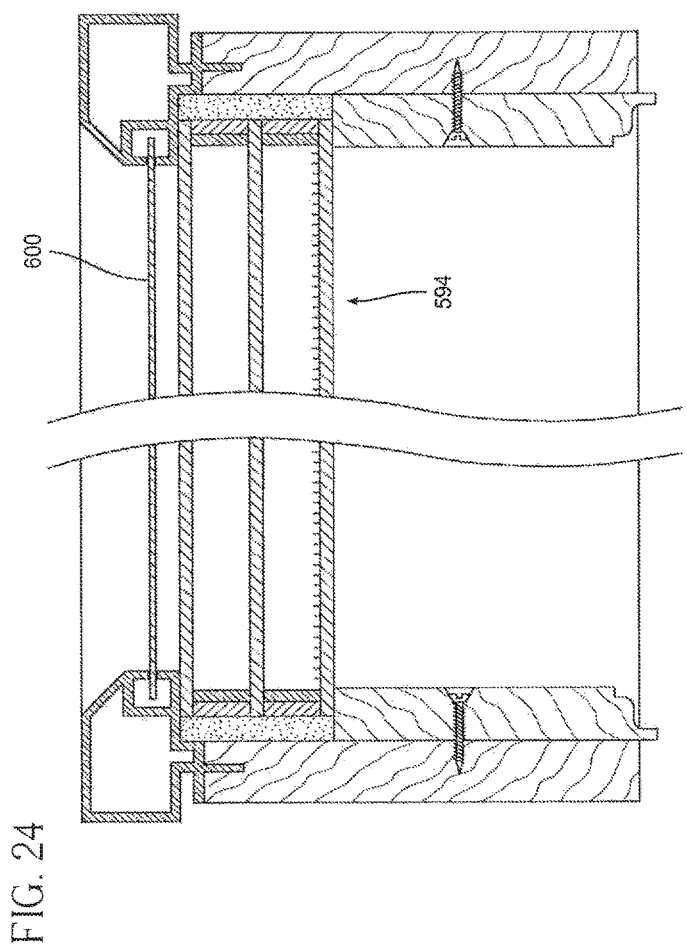
FIG. 24 illustrates a top sectional view of a unitary assembly for an architectural fenestration, which provides dynamic solar heat gain control, and which includes a generic blind and a triple glazing window.
Figure 25:
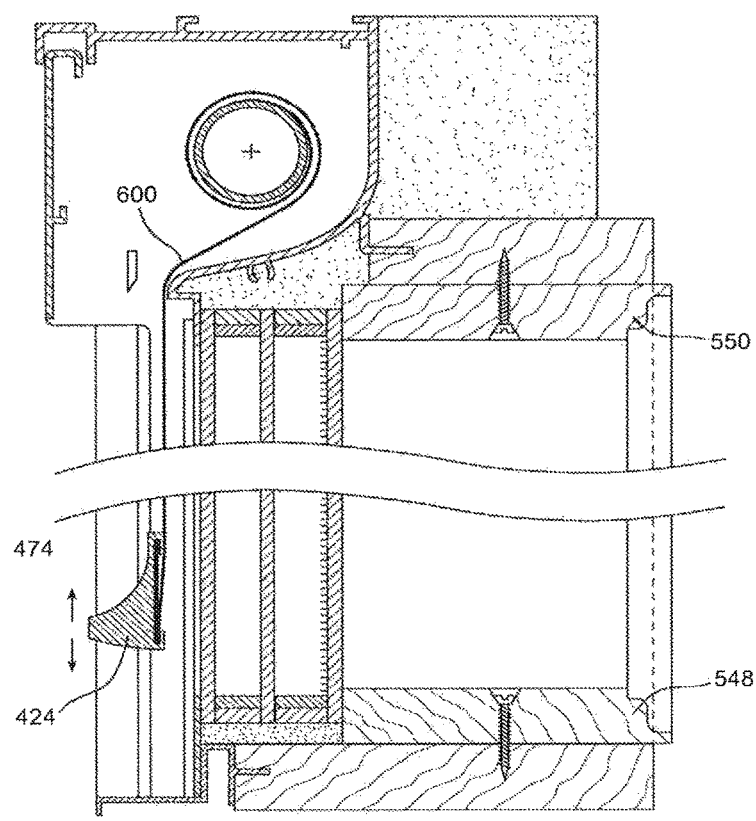
FIG. 25 illustrates a side sectional view of the assembly of FIG. 24.

Turning to FIGS. 24 and 25, this alternative configuration is essentially the same configuration as illustrated in FIGS. 14-17. The same glazing 594 is utilized as well. The primary difference is the use of a generic fiberglass roller blind 600 rather than the slatted roller blind 10. Other aspects of the blind are consistent with the slatted blind. For example, the bottom rail 424 has the same size and function as with the slatted blind 10 and it includes the track guides, e.g., 468.

Utilizing the generic fiberglass blind could result in the loss of the self-correcting function of the above disclosed embodiments. However, other stiffeners could be added to the blind 600 in the widthwise direction to prevent bunching of the blind during rollup and to enable the self-correcting aspect of the blind and frame combination.

Quad Glazing with Gel Fill

Figure 26:
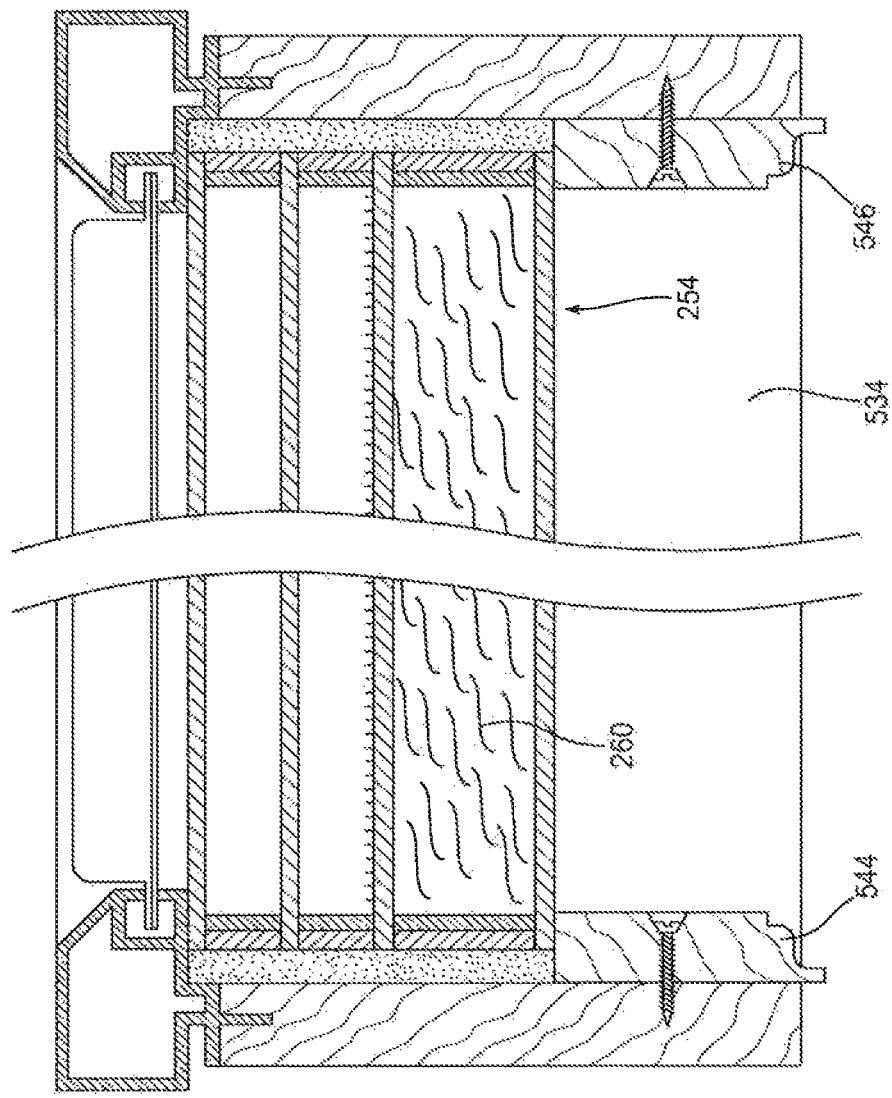
FIG. 26 illustrates a top sectional view of a unitary assembly for an architectural fenestration, which provides dynamic solar heat gain control, and which includes a slatted blind and a quad glazing window of FIG. 12.
Figure 27:
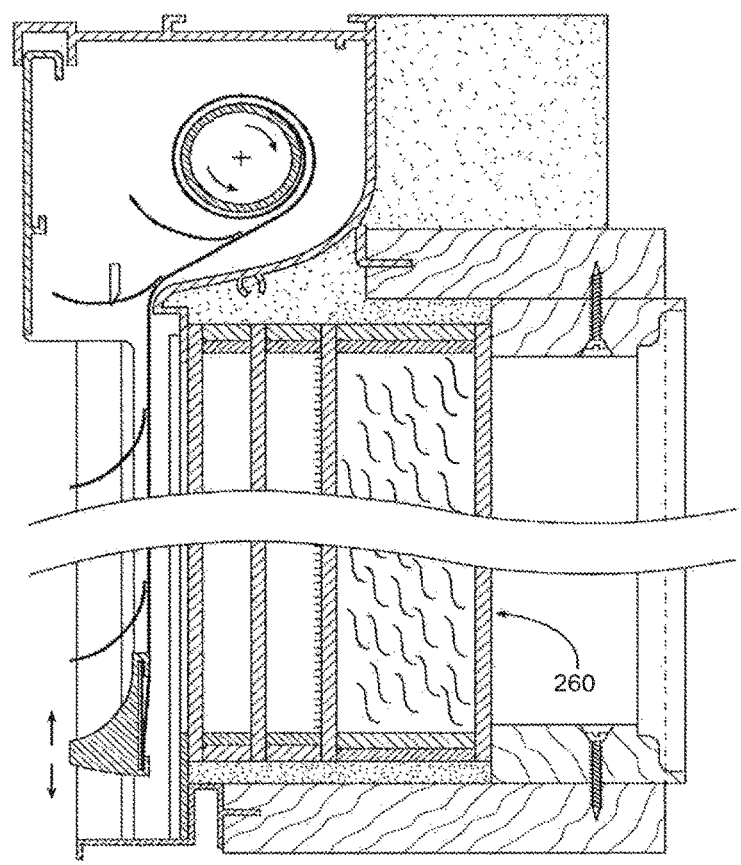
FIG. 27 illustrates a side sectional view of the assembly of FIG. 26.

FIGS. 26 and 27 illustrate the usage of the quad glazing 254 disclosed above. As indicated, the glass stops 544, 546, 548, 550 are smaller to accommodate for the larger volume in the cavity 534 taken up by the glazing. As compared with previously disclosed triple glazing 594, the gel 260 will soak up the heat and dissipate it into the interior over time.

Triple Glazing with Block Storage Units and Heat Absorbing Mask

Figure 28:
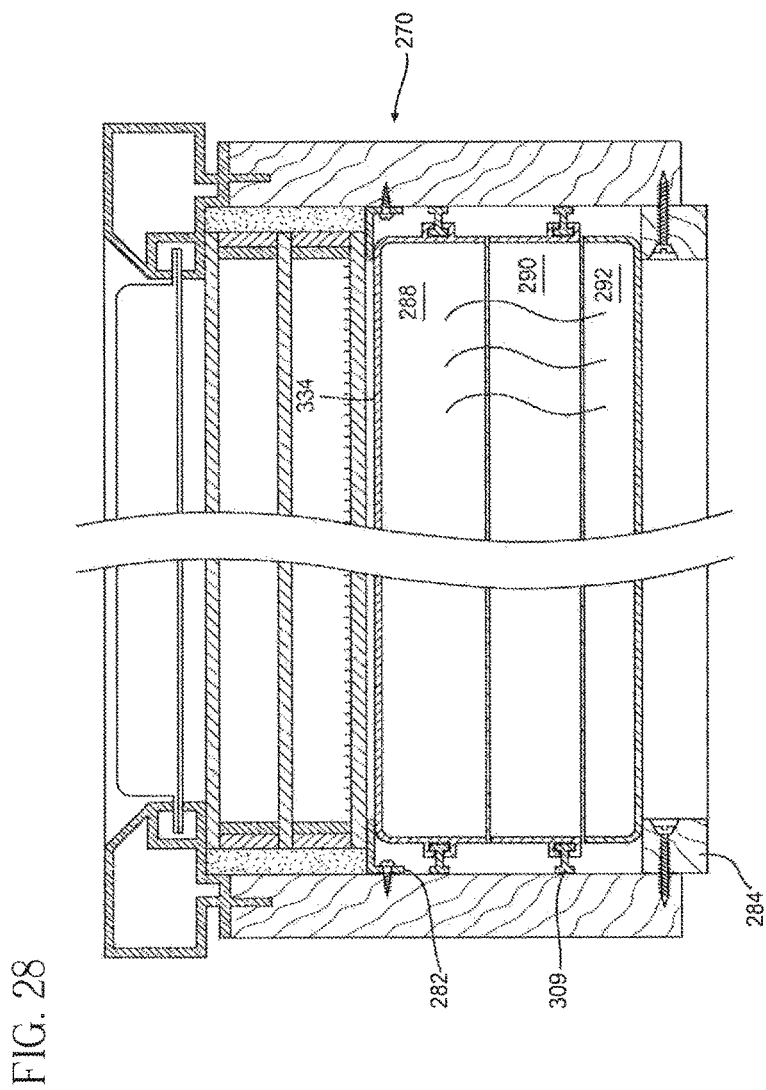
FIG. 28 illustrates a top sectional view of a unitary assembly for an architectural fenestration, which provides dynamic solar heat gain control, and which includes a slatted blind, a triple glazing window, a solar heating block array of FIG. 13, and a mask on the solar heating block array.
Figure 29:
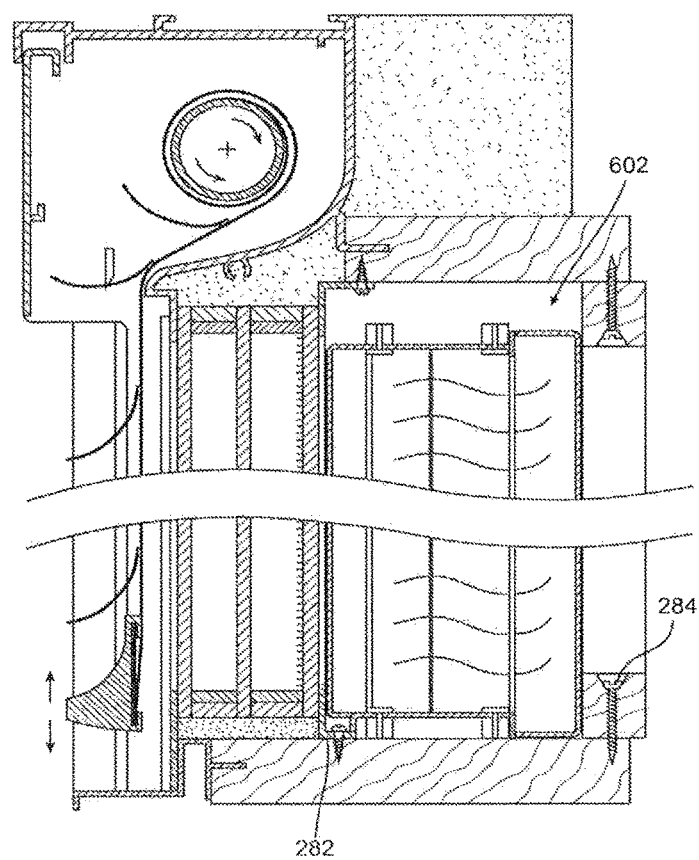
FIG. 29 illustrates a side sectional view of the assembly of FIG. 28.
Figure 30:
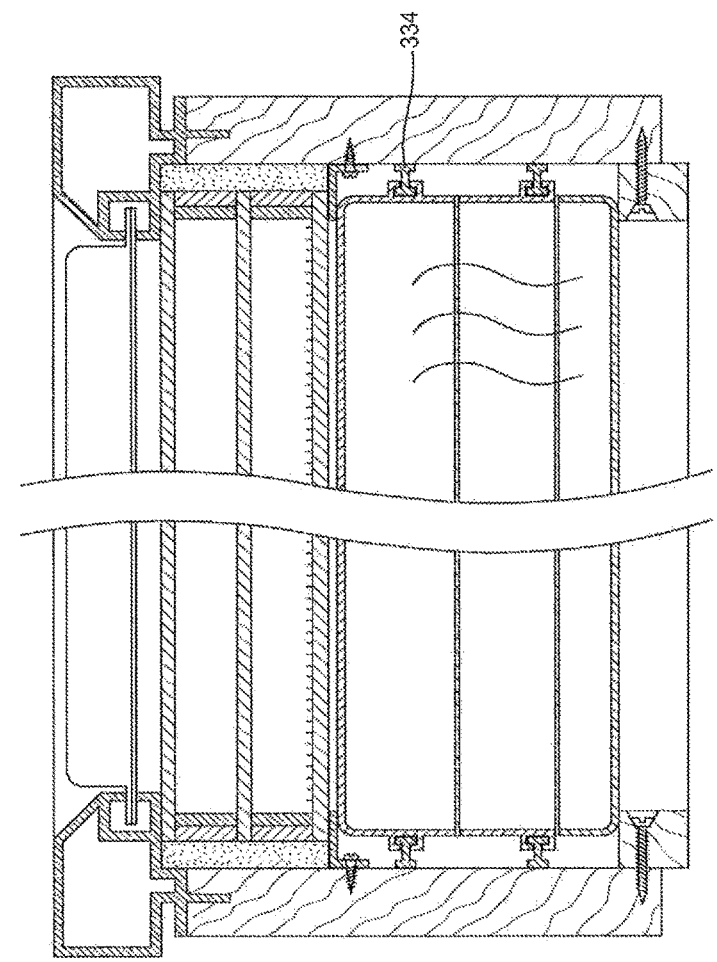
FIG. 30 illustrates a top sectional view of a unitary assembly for an architectural fenestration, which provides dynamic solar heat gain control, and which includes a slatted blind, a triple glazing window, the solar heating block array of FIG. 13, and the mask on the interior surface of the interior lite.
Figure 31:
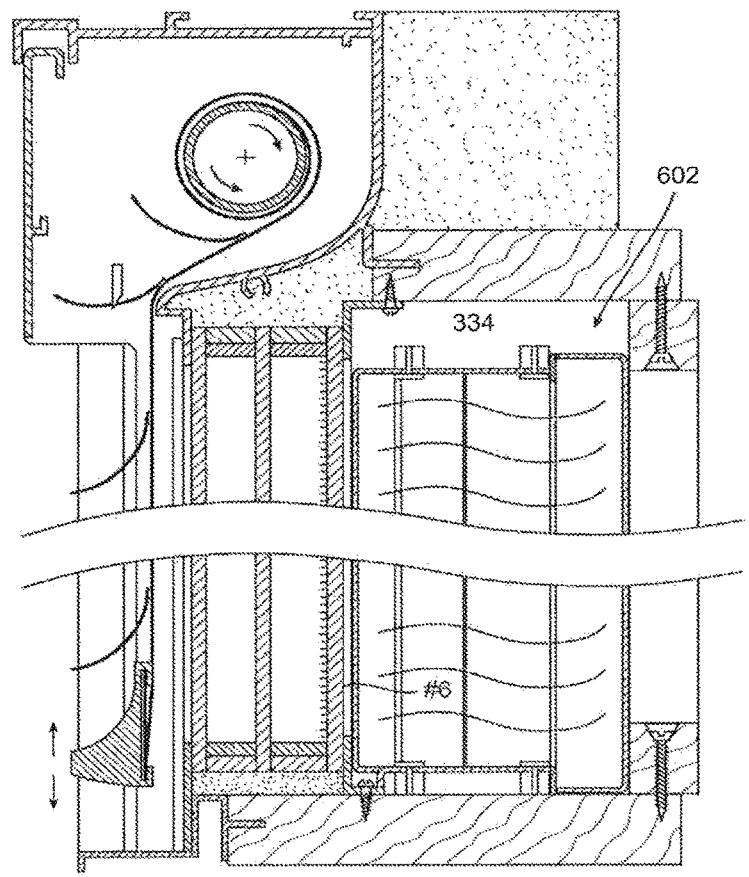
FIG. 31 illustrates a side sectional view of the assembly of FIG. 30.

FIGS. 28-31 illustrate two embodiments which are configured with the triple glazing of FIGS. 29 and 30 along with the panel of solar heating cells 270 illustrated in FIGS. 13A-13C. In the embodiments, glass and block stops, e.g., 282, 284 are illustrated, which are screwed into the adjacent frame members. As illustrated in FIGS. 29 and 31, spacing 602 above to top row of blocks is provided, enabling lifting the blocks for removal purposes. In the configuration of FIGS. 28-29, the heat absorbing mask 334 is illustrated on the exterior side of the blocks. In the configuration of FIGS. 30-31, the mask is on the interior surface of the interior lite, i.e., the #6 surface.

Accordingly, what has been disclosed is a unitary assembly for an architectural fenestration, providing dynamic solar heat gain control, which: (1) provides a track-based frame structure/blind combination in which the blind is self-correcting should the blind material fall outside of the track; (2) provides directional shading, where the assembly provides for dynamically controlling the amount of light allowed to reach the heat storage unit; (3) provides a blind motor without limiter switches and with a quick-release slip-ring; and (4) provides a heat storage unit which is a thermally efficient, transparent and translucent structure, with which gain from sunny winter days is greater than nighttime loss, so as to provide supplemental heat.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

We claim:

1. An assembly for covering an architectural opening, said assembly comprising:
    a shade including a shade material, said shade material movable between a retracted position and an extended position;
    a plurality of louvers coupled to and extending outwardly from said shade material, each of said louvers extending in the widthwise direction between a first side segment and a second side segment opposite said first side segment;
    a frame positioned relative to the architectural opening, said frame defining a guide track configured to receive opposed side sections of said shade material as said shade material is moved between said retracted and extended positions, said guide track including a first side track and an opposed second side track, said first track configured to receive said first side segment of each of said louvers, and said second guide track configured to receive said second side segment of each of said louvers as said shade material is moved between the extended and retracted positions; and
    a bottom rail coupled to a bottom end of said shade material, said bottom rail extending in the widthwise direction between a first end positioned adjacent to said first side track and a second end positioned adjacent to said second side track, said bottom rail including a first track guide extending from said first end into said first side track and a second track guide extending from said second end into said second side track;

wherein said first and second track guides are maintained within said first and second side tracks as said shade material is moved between said retracted and extended positions.

2. The assembly as in claim 1, wherein, when said shade material is in said retracted position, said side sections of said shade material are positioned outside of said first and second side tracks while said first and second track guides are maintained in engagement with said first and second side tracks.

3. The assembly as in claim 1, further comprising first and second guide plates positioned directly above said first and second side tracks, respectively, said first and second guide plates configured to maintain said shade material centered in a widthwise direction relative to said first and second side tracks.

4. The assembly as in claim 1, wherein:
each of said louvers includes a first edge coupled to said shade material and a second edge opposite said first edge;
each of said louvers defines a louver depth between said first and second edges; and
said opposed side segments of each of said louvers are notched so that each side segment defines a notch depth that is less than said louver depth.

5. The assembly as in claim 4, wherein said second edge is provided in a cantilevered arrangement relative to said shade material.

6. The assembly as in claim 1, wherein said bottom rail defines a rail width between said first and second ends, said rail width being less than a track width defined between said first and second side tracks.

7. The assembly as in claim 6, wherein said shade material defines a shade width, said shade width being greater than said rail width.

8. The assembly as in claim 1, further comprising a transverse alignment guide positioned above said first and second side tracks, said transverse alignment guide configured to support an underside of said shade material as said shade material is moved between said retracted and extended positions.

9. The assembly as in claim 8, wherein said transverse alignment guide defines a forward edge, said forward edge being vertically aligned with said first and second side tracks.

10. The assembly as in claim 9, further comprising a roller about which said shade material is wound and unwound when said shade material is being moved between said retracted and extended positions, said roller defining a rotational axis that is offset laterally from said forward edge of said transverse alignment guide and said first and second side tracks.

11. An assembly for covering an architectural opening, said assembly comprising:
a shade including a shade material, said shade material movable between a retracted position and an extended position, said shade material extending in a widthwise direction between a first side section and a second side section opposite said first side section;
a frame positioned relative to the architectural opening, said frame defining a guide track configured to receive opposed side sections of said shade material as said shade material is moved between said retracted and extended positions, said guide track including a first side track configured to receive said first side section of said shade material and an opposed second side track configured to receive said second side section of said shade material;
a transverse alignment guide positioned above said first and second side tracks, said transverse alignment guide configured to support an underside of said shade material as said shade material is moved between said retracted and extended positions; and
first and second guide plates positioned above said first and second side tracks respectively, said first and second guide plates extending outwardly from opposed first and second walls of the frame, respectively, in the widthwise direction and being configured to maintain said shade material positioned between said first and second guide plates in said widthwise direction as said shade material moves between said transverse alignment guide and said guide track.

12. The assembly as in claim 11, further comprising a roller about which said shade material is wound and unwound when said shade material is being moved between said retracted and extended positions, said roller defining a rotational axis that is offset laterally from a forward edge of said transverse alignment guide and said first and second side tracks.

13. The assembly as in claim 11, wherein:
said transverse alignment guide defines a forward edge; and
said forward edge is vertically aligned with said first and second side tracks.

14. The assembly as in claim 11, wherein said first and second guide plates are configured to maintain said shade material centered in said widthwise direction between said first and second guide plates as said shade material moves between said transverse alignment guide and said guide track.

15. The assembly as in claim 11, wherein:
said shade further comprises a plurality of louvers coupled to and extending outwardly from said shade material;
each of said louvers includes opposed side segments that overlie said opposed side sections of said shade material; and
said opposed side segments are received within said first and second side tracks as said shade material is moved between said retracted and extended positions.

16. The assembly as in claim 15, wherein
each of said louvers includes a first edge coupled to said shade material and a second edge opposite said first edge;
each of said louvers defines a louver depth between said first and second edges; and
said opposed side segments are notched so that each side segment defines a notch depth that is less than said louver depth.

17. The assembly as in claim 16, wherein said second edge is provided in a cantilevered arrangement relative to said shade material.

18. The assembly as in claim 11, further comprising a bottom rail coupled to a bottom end of said shade material, said bottom rail extending in the widthwise direction between a first end positioned adjacent to said first side track and a second end positioned adjacent to said second side track, said bottom rail including a first track guide extending from said first end into said first side track and a second track guide extending from said second end into said second side track;

wherein said first and second track guides are maintained within said first and second side tracks as said shade material is moved between said retracted and extended positions.

19. The assembly as in claim 18, wherein, when said shade material is in said retracted position, said side sections of said shade material are positioned outside of said first and second side tracks while said first and second track guides are maintained in engagement with said first and second side tracks.

20. An assembly for covering an architectural opening, said assembly comprising:
- a shade including a shade material and a plurality of louvers coupled to and extending outwardly from said shade material, said shade material including opposed side sections and being movable between a retracted position and an extended position, each of said louvers including a first edge and a second edge opposite said first edge, each said louvers further comprising opposed side segments that overlie said opposed side sections of said shade material; and
- a frame positioned relative to the architectural opening, said frame defining a guide track configured to receive both said opposed side sections of said shade material and said opposed side segments of said louvers as said shade material is moved between said retracted and extended positions, said guide track including a first side track and an opposed second side track;
- wherein said opposed side segments are notched so that each side segment defines a notch depth that is less than a louver depth defined between said first and second edges of each of said louvers.

21. An The assembly as in claim 20, further comprising first and second guide plates positioned directly above said first and second side tracks, respectively, said first and second guide plates configured to maintain said shade material centered in a widthwise direction relative to said first and second side tracks.

22. The assembly as in claim 20, wherein said second edge is provided in a cantilevered arrangement relative to said shade material.

23. The assembly as in claim 20, further comprising a transverse alignment guide positioned above said first and second side tracks, said transverse alignment guide configured to support an underside of said shade material as said shade material is moved between said retracted and extended positions.

24. The assembly as in claim 23, wherein said transverse alignment guide defines a forward edge, said forward edge being vertically aligned with said first and second side tracks.

25. The assembly as in claim 24, further comprising a roller about which said shade material is wound and unwound when said shade material is being moved between said retracted and extended positions, said roller defining a rotational axis that is offset laterally from said forward edge of said transverse alignment guide and said first and second side tracks.

26. The assembly as in claim 20, further comprising a bottom rail coupled to a bottom end of said shade material, said bottom rail extending widthwise between a first end positioned adjacent to said first side track and a second end positioned adjacent to said second side track, said bottom rail including a first track guide extending from said first end into said first side track and a second track guide extending from said second end into said second side track;
- wherein said first and second track guides are maintained within said first and second side tracks as said shade material is moved between said retracted and extended positions.

27. The assembly as in claim 26, wherein, when said shade material is in said retracted position, said side sections of said shade material are positioned outside of said first and second side tracks while said first and second track guides are maintained in engagement with said first and second side tracks.

* * * * *